United States Patent [19]
DeKoning

[11] Patent Number: 6,148,368
[45] Date of Patent: Nov. 14, 2000

[54] METHOD FOR ACCELERATING DISK ARRAY WRITE OPERATIONS USING SEGMENTED CACHE MEMORY AND DATA LOGGING

[75] Inventor: Rodney A. DeKoning, Wichita, Kans.

[73] Assignee: LSI Logic Corporation, Milpitas, Calif.

[21] Appl. No.: 08/904,107

[22] Filed: Jul. 31, 1997

[51] Int. Cl.[7] ................................................ G06F 12/08
[52] U.S. Cl. ......................... 711/113; 711/114; 711/129; 711/173; 710/53; 714/6
[58] Field of Search ................................ 711/113, 114, 711/129, 173, 118, 161, 162; 714/6; 710/53; 707/204

[56] References Cited

U.S. PATENT DOCUMENTS

| | | | |
|---|---|---|---|
| 5,163,132 | 11/1992 | Dulac et al. ............................. | 710/53 |
| 5,195,100 | 3/1993 | Katz et al. ............................... | 371/66 |
| 5,297,258 | 3/1994 | Hale et al. ............................... | 395/275 |
| 5,309,451 | 5/1994 | Noya et al. .............................. | 711/129 |
| 5,375,128 | 12/1994 | Menon et al. ........................... | 371/40.1 |
| 5,379,417 | 1/1995 | Lui et al. ................................. | 395/575 |
| 5,390,327 | 2/1995 | Lubbers et al. ......................... | 395/575 |
| 5,408,644 | 4/1995 | Schneider et al. ...................... | 711/118 |
| 5,418,921 | 5/1995 | Cortney et al. ......................... | 711/167 |
| 5,418,925 | 5/1995 | DeMoss et al. ......................... | 395/425 |
| 5,432,922 | 7/1995 | Polyzois et al. ........................ | 395/425 |
| 5,463,765 | 10/1995 | Kakuta et al. ........................... | 395/182.04 |
| 5,479,653 | 12/1995 | Jones ........................................ | 395/182.03 |
| 5,490,248 | 2/1996 | Dan et al. ................................. | 395/182.04 |
| 5,497,457 | 3/1996 | Ford et al. ............................... | 395/182.04 |
| 5,533,190 | 7/1996 | Binford et al. .......................... | 395/182.04 |
| 5,542,066 | 7/1996 | Mattson et al. ......................... | 711/136 |
| 5,548,711 | 8/1996 | Brant et al. .............................. | 395/182.03 |
| 5,557,770 | 9/1996 | Bhide et al. ............................. | 711/161 |
| 5,623,700 | 4/1997 | Parks et al. .............................. | 710/53 |
| 5,634,109 | 5/1997 | Chen et al. .............................. | 711/143 |
| 5,640,506 | 6/1997 | Duffy ....................................... | 714/6 |

OTHER PUBLICATIONS

Chen et al., "Raid: High Performance, Reliable Secondary Storage", ACM Computing Surveys, vol. 26, No. 2, pp. 145–185.

Primary Examiner—Hiep T. Nguyen

[57] ABSTRACT

Method and apparatus for accelerating write operations logging write requests in a log structured cache and by expanding the log structured cache using a cache-extension disk region. The log structured cache include a cache memory region partitioned into one or more write cache segments and one or more redundancy-data (parity) cache segments. The cache-extension disk region is a portion of a disk array separate from a main disk region. The cache-extension disk region is also partitioned into segments and is used to extend the size of the log structured cache. The main disk region is instead managed in accordance with storage management techniques (e.g., RAID storage management). The write cache segment is partitioned into multiple write cache segments so that when one is full another can be used to handle new write requests. When one of these multiple write cache segments is filled, it is moved to the cache-extension disk region thereby freeing the write cache segment for reuse. The redundancy-data (parity) cache segment holds redundancy data for recent write requests, thereby assuring integrity of the logged write request data in the log structured cache.

48 Claims, 16 Drawing Sheets

METHOD FOR ACCELERATING DISK ARRAY WRITE OPERATIONS USING SEGMENTED CACHE MEMORY AND DATA LOGGING

BACKGROUND OF THE INVENTION

1. Field of the Invention

The present invention relates to disk array storage subsystems for computer systems and, more particularly, to a method for extending the effective size of a controller cache memory to thereby improve write performance of the subsystem.

2. Background of the Invention

The most cost-effective storage technologies, magnetic and optical disks, have electromechanical components which make them slower and more prone to failure than electronic devices. The mechanical process of seeking and disk rotation slows input/output of data from the disk to a host computer. Redundant arrays of independent (or inexpensive) disks (commonly known by the acronym RAID) speeds up access to data on disks by providing parallel or independent access to disks and improves reliability by generating redundancy data such as mirroring data or providing redundancy information (typically parity) on separate disks from which failed data can be reconstructed. These alternatives were set forth in the Berkeley Papers; one of which is *A Case for Redundant Arrays of Inexpensive Disks (RAID)* by Patterson et al., University of California Report NO. UCB/CSD 87/391, December 1987, incorporated herein by reference. The paper describes five RAID "levels", or arrangements of data on arrays of disks, which have become industry standards.

Parity RAID refers to those levels (RAID 3, 4, 5) in which parity data is used to protect user data. RAID level 5 has emerged as a popular choice because it allows for independent access to data which is striped in blocks across a disk array. Parity is also distributed across the array. Parity is the exclusive OR (XOR) of data in separate disks. Parity data can be used to reconstruct data if any single disk fails. There is, however, an asymmetry in input/output performance in RAID 5. The read operation is faster than the write operation because when an application writes data, the parity blocks that protect data at addresses affected by the write must be updated.

FIG. 1 shows a typical write operation 100 for RAID level 5. Write request data 101 is to be written to disk 102 and its redundancy data (e.g. parity) to disk 106, disk 104 is not involved. The initial contents of disk 102, the target block, must be first read from disk 102. This is shown as arrow 110. At the same time parity for the target block is read from disk 106, shown as arrow 112. The target block's contribution to parity is computed by taking the exclusive OR (represented by a circled plus sign) of the two via sum 114. New parity is computed as the exclusive OR of this intermediate result 115 and write request data 101 to be written via sum 116. The updated parity is then sent to disk 106 shown as arrow 118. The new write request data is then written to disk 102 shown as arrow 120. This read-modify-write sequence results in elapsed time and requires I/O resources greater than would be the case if the same request were made to an individual disk. This increased resource consumption and longer elapsed time are collectively known as the parity RAID write penalty.

Write-back caching techniques are known to reduce the effects of write penalty. A solid state cache memory on the RAID controller is effectively inserted into the I/O path. Data in the cache memory is returned from the cache memory in response to host generated read requests. Therefore, when applications request cached data it can be delivered immediately without delay caused by disk seeking and rotation. A write-back cache is also used to hold data supplied by application write requests for posting (flushing) to the disk array at a later time. A write-back cache enabled RAID controller receives application write request data, saves the supplied data in the cache, and then signals that the request is complete. This allows applications to continue executing without waiting for the written data to be posted to the relatively slow disk device(s). The I/O system actually writes the data at some later time, ideally when the disk(s) would otherwise be idle.

A particular advantage of write-back cache is that it alleviates some of the conflicts between tuning an array for I/O loads having high I/O request throughput requirements (a large number of I/O requests having small data portions associated with each) versus high data throughput requirements (a small number of I/O requests each having a large volume of data associated therewith). It is advantageous to accumulate small data I/O requests in cache memory so that the aggregation of their data may be written to the disk array as a single "stripe write" (an operation involving all disks of the array in parallel operation). Striping large data I/O requests across many disks allows parallel access allows quick reading or writing of large amounts of data. If a write-back-cache is present, then writes can be deferred, thus minimizing the write Penalty. With a large write-back cache, data can accumulate in cache and be consolidated into a single write so that only one read-modify-write sequence and disk seek and rotation operation needs to be done for multiple consolidated writes.

If a write-back cache is barraged with a steady stream of write requests for a long enough time to fill cache, then the system will revert to operation which is identical to that without cache. This is because cache would constantly have to flush data to disk in order to make space for newly arriving data. The system is then bounded by the disk's speed of absorbing data, just as when no cache is present. This is known as saturation.

Prior cache designs are typically tuned to a fixed size and architecture best suited to a particular application and performance goal. A large cache may be wasteful where a small number of large write requests are common while a smaller cache may be inadequate to reduce the write penalty where a large number of small write requests are common.

A need therefore exists to improve write operations in disk array storage devices. This need is particularly acute in applications having both high throughput and data intensive requests. Such an improved device would have a wider range of usefulness. However any cache architecture solution to this problem must assure data reliability and integrity which forms the core of all RAID subsystems.

SUMMARY OF THE INVENTION

The present invention solves the above and other problems, thereby advancing the state of the useful arts, by providing a method for accelerating write operations by extending the effective size of cache memory with a log structured extended cache architecture. The log structured extended cache uses a cache-extension disk region and logically partitions a portion of the cache memory on the storage controller into write cache segments used to log write request data and at least one redundancy-data cache segment (also referred to as parity segment or log parity segment). The cache-extension disk region is a portion of a disk array which is separate from a main disk region used for persistent data storage. The cache-extension region is also logically partitioned into a plurality of segments used to hold filled write cache segments from cache memory.

The log structure of the extended cache holds or logs write requests received from an attached host computer (along with references to the data supplied with the write requests). The logged write requests are not actually processed for posting to the disk array until a later time. Presumably such a later time will arise when the storage subsystem is less (essentially idle) busy. The RAID 5 write penalty may thereby be deferred A until a point where the penalty is less likely to impact subsystem performance characteristics.

Cache memory includes multiple write cache segments used to log write requests received from attached host computer systems. When a first such write cache segment is full another can be used to handle new write requests in a "ping-pong" or "circular" manner. When one of these multiple write cache segments is filled, it is transferred to the cache-extension disk region thereby freeing that cache segment for reuse. As cache-extension disk region segments fill, they are eventually posted (flushed) to the main disk region for persistent storage. At all times, redundancy-data cache segment holds the redundancy data for the present set of filled segments of the segmented cache (also referred to herein as the extended cache).

Write cache segments and corresponding cache-extension region segments used to extend the effective size of the segmented memory cache are large enough to permit improved performance when writing to disk drives. Though the precise size of the cache segments is tuned for a particular environment, the size is preferably at least as large as a track size of the disk storage devices to achieve the benefits of large write sizes. It is known in the art that a large block write operations to disk are more efficient than a plurality of small block write operations. The extension of the write cache segments using disk storage for the cache extension region improves the effective size of the cache memory. The size of the write cache segments and the corresponding segments in the cache extension region of the disk storage is large enough to minimize the time required for disk write operation in using the extended cache architecture.

At any given time, the presently filled cache segments may reside in the cache memory write cache segments, and/or the cache-extension disk region while awaiting eventual posting to the main disk region for persistent storage in accordance with the storage management techniques employed for the main disk region (e.g., RAID storage management). This structure and the associated methods for use of same effectively extend the size of the cache memory by using disk storage capacity of the disk array. This extended cache architecture may be enlarged by reconfiguring the number of cache segments to optimally accumulate large numbers of small write requests. The aggregated small write requests may then be flushed to the main disk region with reduced write penalty as compared to prior techniques. Conversely, the extended cache architecture may be reconfigured to reduce the number of cache segments when the subsystem is used primarily for write operations with large data portions.

The size and number of segments allocated within the cache memory and the cache-extension region of the disk array may be dynamically tuned as required of the particular application and the particular performance goals. Prior designs, by contrast as noted above, tend to use a fixed size cache. The fixed size cache is not easily scaled to adapt performance in view of dynamically changing environmental conditions. The cache architecture of the present invention and methods for use of same allow for dynamic reconfiguration of the cache size to adapt to changes in the storage subsystem usage or in the desired performance goals.

In operation, first write request data is received and logged in a first write cache segment until it is full. A second write cache segment is then used to log new write requests. The first write request's redundancy data is generated when the first write cache segment is filled and is saved in the redundancy-data (parity) cache segment. Eventually the first write request data is moved by background processing to the cache-extension disk region, thus freeing the first write cache segment for reuse. Other background processing periodically flushes (posts) logged requests from the cacheextension disk region to the main disk region to thereby free disk cache segments for reuse. This process continues reusing write cache segments and disk cache segments. For example, when the second write cache segment is filled, then new write requests are again logged in the first write cache segment, the second write request data's redundancy data is generated and added to the redundancy-data (parity) cache segment, and the second write request data is eventually moved to the cache-extension disk region.

Background processing periodically posts (flushes) data logged in the cache-extension region of the disk array onto the main disk region. The data logged is posted in accordance with the storage management techniques applied to the main disk region (e.g., RAID storage management). The redundancy information in the parity cache segment is adjusted to remove the segment successfully posted to the main disk region. Before posting the logged requests, more recently received and logged requests are inspected to determine if any data in the logged requests about to be posted have been invalidated by overwrites in more recently logged requests. For example, the first write request data is read from the cache-extension disk region; its redundancy data is subtracted out of the redundancy-data cache segment; any overwrites that occurred in more recent write requests are invalidated, and then the first write request data is flushed from the cache-extension region to the main disk region. The cache-extension disk space previously containing the first write request data is marked "not in use" or otherwise freed for reuse.

Cache memory is further partitioned into one or more standard cache segment which can be used for read requests and other operations. The standard cache segments are utilized in accordance with well known cache management techniques to retain read data for subsequent reads. In addition, as noted elsewhere herein, standard cache segments may be used for caching write requests in accordance with known cache management techniques when the log structure segmented cache of the present invention is filled to capacity or non-functional for any of several reasons. In other words, operation of the cache memory of the present invention may revert to operation in accordance with known techniques where the techniques and structure of the present invention are inoperable or otherwise unavailable. During normal operations, read requests utilize standard cache management techniques to read data from the standard cache segments. However prior to inspecting the standard cache segments, the extended cache log structure of the present invention is consulted to determine if the requested data has been modified by logged write requests. Such modified data found in the log structured extended cache is returned to the user from the log structure rather than from the standard cache segments or disk media.

The cache-extension disk region preferably comprises a region on the disk array which is subdivided into segments each of which having a size equal to the size of write cache segments in cache memory. More complex mapping arrangements can be used with the above general concept wherein the number of disk cache segments, write cache segments, and log parity cache segments may vary and wherein portions of the log parity cache segments may reside in the cache-extension disk region. For instance, write request data can be moved from write cache segments to the cache-extension region with their redundancy data with the redundancy data going to a separate disk cache segment in the cache-extension disk region. Or, the write cache segment, the redundancy-data cache segment and the cache-extension disk region can be divided into a number of stripes.

The effective space of the cache is therefore extended by using the cache-extension disk region for most recent write requests. The cache-extension disk region is preferably used in a manner analogous to a log structured file system so that complexity involved with RAID level mapping to the main disk region can be deferred.

A large cache provides advantages of alleviating bottlenecks during bursty periods of high input/output traffic and can also handle data intensive requests. This reduces the response time of the input/output system because accumulated smaller write requests can be posted to the main disk region during quieter periods.

Using the log parity cache segment for parity data of most recent write requests protects write request data without using disk space. Therefore computing redundancy data, e.g. parity, can be done faster. Also, if a read request comes in for data which is still in cache, then the new parity can be computed without going to a disk. This can speed up operation of cache.

To assure maximum reliability of the subsystem operable in accordance with the present invention, the segmented cache structure and the log meta-data information associated therewith is preferably mirrored to a redundant store. Such mirrored operations, including mirrored controller operation and associated cache mirroring, are known to those skilled in the art.

It should be noted that this technique will allow better write performance for write operations up until the cache-extension region is full. At this point, the controller shifts its mode of operation to appear a normal write operation where data is written to the main disk region in the conventional manner.

It is therefore an object of the invention to increase throughput of write operations in a disk array storage system by expanding cache using disk storage space for logging recent write requests.

It is another object of the invention to reduce the response time of cache by using a redundancy-data cache segment to hold redundancy data for write request data which has not yet been flushed to the main disk region.

The above and other objects, aspects, features, and advantages of the present invention will become apparent from the following description and the attached drawings.

DETAILED DESCRIPTION OF THE INVENTION

Figure 1:
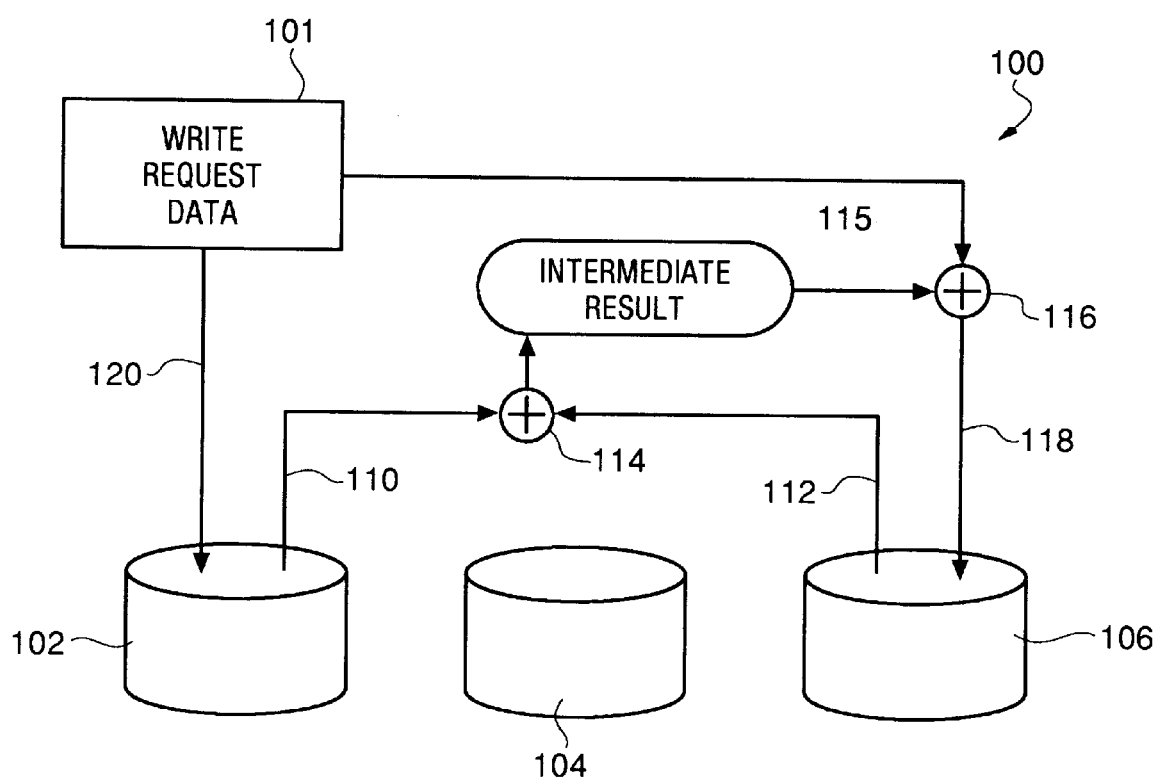
FIG. 1 is a block diagram depicting a typical prior art RAID write operation.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

Figure 2:
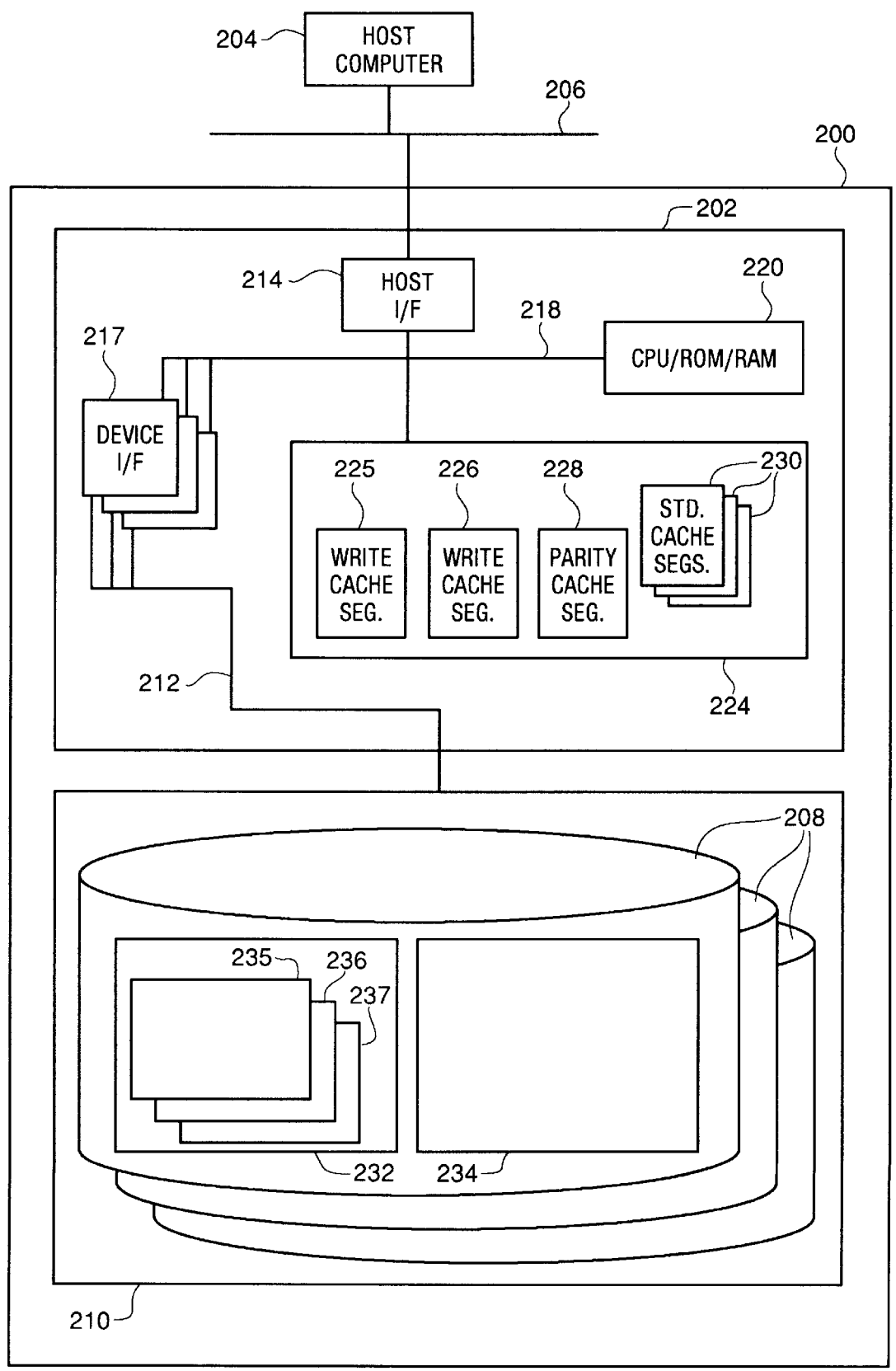
FIG. 2 is a block diagram depicting the storage subsystem of the present invention in which the method of the invention is operable.

FIG. 2 depicts a RAID storage subsystem 200 configured in accordance with the methods and structures of the present invention. Methods of the present invention are operable within storage subsystem 200 and in particular are operable within controller 202 of subsystem 200. RAID controller 202 is connected to one (or more) host computer(s) 204 via standard bus 206 through host interface 214. Those skilled in the art will recognize many well known interconnection buses and standards for connecting subsystem 200 to host computer 204. SCSI, LAN, FC-AL, SSA, and others are exemplary of such interface standards for connecting host computers and storage subsystems.

Controller 202 is connected to storage array 210 (also referred to herein as disk array 210) via device interfaces 217 through interface buses 212. Those skilled in the art will readily recognize many well known buses and interface standards applicable on bus 212 to connect controller 202 to disk array 210. SCSI, EIDE, FCAL, SSA and others are exemplary of such interface standards.

Cache memory 224 in controller 202 is used, in accordance with the present invention, to cache write data received from host computers 204 as well as to cache data recently read from disk array 210. Cache memory 224 thereby improves performance of subsystem 200 by reducing the need to wait for slower disk drive mechanical operations to complete host I/O requests. In controller 202 bus 218 connects CPU 220 (including requisite RAM and ROM memory for fetching and executing programmed instructions) to all other devices including host interface 214, device interfaces 217 and cache memory 224. Appropriate bus bridging devices (not shown) are well known to those skilled in the art to adapt and isolate the various bus standards and interconnections within controller 202.

Disk array 210 comprises a plurality of storage elements 208 (for example, disk drives). Cache-extension disk region 232 and main disk region 234 are each areas of storage distributed across the plurality of disk drives 208 of disk array 210. Collectively, cache-extension disk region 232 and partitioned cache memory 224 are referred to herein as extended cache memory. Main disk region 234 is the remainder of the storage in disk drives 208 of disk array 210. Persistent data storage is managed in accordance with RAID storage management techniques in main disk region 234. Write data received from host computer 204 request is, usually, temporarily stored in extended cache memory in accordance with the methods of the present invention so that the host I/O write request may be completed without the need to wait for mechanical delays of disk drives 208. Data read from disk drives 208 is, usually, saved for successive reads in standard cache segments 230 of segmented cache memory 224.

In accordance with the present invention, partitioned cache memory 224 comprises a plurality of write cache segments 225 and 226, one or more data-redundancy (parity) cache segments 228, and the remainder of the cache as one or more standard cache segments 230. Because it is an electronic component (e.g., semiconductor memory devices), cache memory 224 operates much faster than disk array 210. A portion of partitioned cache memory 224, namely standard cache segments 230, operate in accordance with well known standard caching techniques to cache data recently read from disk array 210 and in certain cases to cache write data received from host requests. As noted above, the extended cache log structure of the present invention is consulted prior to reading data from the standard cache segments to assure that current data is returned to the user in response to read requests.

However, another portion of partitioned cache memory 224, namely write cache segments 225 and 226 and parity cache segment 228, operate in a wholly different manner to cache host generated write requests. These segments of partitioned cache memory 224 operate in conjunction with disk segments 235–237 in cache extension disk region 232 to log information regarding all received write requests. The logged information includes the write data as well as metadata identifying the destination of the write data in the LUN to which it was addressed. This logged information is accumulated in a write cache segment (225 or 226). Disk cache segments 235–237 are used to extend the size of the log write cache segments 225 and 226. The log area contains information and is managed in a manner analogous to log structure file systems. The logged information is eventually processed so as to post the data persistently to the main disk region 234 in accordance with the RAID (or other) storage management techniques applied thereto.

Partitioned cache memory 224 is used in accordance with the present invention to reduce the parity RAID write penalty by buffering and delaying the posting to main disk region 234 until such later time as the write penalty will less affect subsystem performance. In particular, write cache segments 225 and 226 accumulate a number of small write requests by logging the requests in the write cache segments and moving these accumulated write requests to cache-extension disk region 232 ideally when the disk(s) would otherwise be idle, thus reducing time devoted to disk seek and rotation.

More importantly, the buffered small write requests so logged may be coalesced into larger write requests (e.g., RAID stripe writes) for purposes of posting the logged data to the main disk region 234. Techniques analogous to log file system management techniques are applied to the extended cache memory logs to coalesce a number of smaller write operations into a single large write operation thereby reducing the number of writes and associated RAID write penalties imposed on subsystem performance.

In addition, the present invention provides data-redundancy (parity) cache segment 228 which maintains redundancy information regarding the logged write request data in extended cache memory (specifically maintains parity over data logged in write cache segments 225 and 226 and corresponding write cache segments stored in cache-extension disk region 232). This redundancy information provides security over the extended cache memory in case of failure of one or more of the logged segments.

Standard cache segments 230 in partitioned cache memory 224 are operable in accordance with well known cache memory management techniques. In particular, data read from main disk region 234 of disk array 210 is typically saved in standard cache segments 230 for possible re-use in another host I/O request. In addition, certain host write requests may specifically request or require bypass of the logged cache structures and management of the present invention. Such requests may utilize the standard cache segments 230 in accordance with well known write-through or write-back cache management techniques. For example, large host generated write requests may preferably be handled as a RAID level 3 operation rather than using the cache architecture and methods of the present invention. Where such write requests bypass the log structure of the extended cache of the present invention, the log structure is inspected to invalidate any data therein which is overwritten by the RAID level 3 style write operation.

FIG. 2 shows two write cache segments 225 and 226, one data-redundancy cache segment 228 and two standard cache segments 230. There may of course be any number of such segments as appropriate for the particular environment. The various cache segments may vary in size and may be non-uniform in size according to the specific needs of the application. This partitioning of cache is logical in nature and the segments need not be physically contiguous. The function of each segment will become clearer in the following description with respect to FIGS. 3–9.

Disk array 210 comprises cache-extension disk region 232 and main disk region 234. Those skilled in the art will recognize that the cache extension disk region 232 and the main disk region 234 are preferably distributed across portions of many disk drives 208 in disk array 210 rather than using the entirety of specific reserved disk drives. Main disk region 234 comprises remaining portions of disk array 210 storage areas not reserved for use in the cache-extension disk region 232. Cache-extension disk region 232 comprises a number of disk cache segments 235, 236 and 237 used to extend the storage capability of partitioned cache memory 224 by storing recent write requests which have accumulated in write cache segments 225 or 226. A number of small write requests are accumulated in an available write cache segment 225 or 226 of partitioned cache memory 224. When a first write cache segment is full and another write cache segment begins to fill, the filled segment is written to a disk cache segment (e.g., 235, 236 or 237) to await eventual posting to main disk region 234

As discussed below, parity cache segment 228 guards against loss of the logged write requests due to loss of any one of the extended cache segments (225, 226, or 235–237). Loss of any single segment of the extended cache from partitioned cache memory 224 or from cache-extension disk region 232, may be recovered by regeneration of the lost segment using the parity data. Cache-extension disk region 232 thereby extends the useful capacity of cache to accumulate small write requests so that larger disk write operations can be used in posting to main disk region 234. This feature reduces the write penalty overhead known in prior raid storage subsystems when posting small write requests to array storage.

Three disk cache segments 235, 236 and 237 are shown in FIG. 2 but it should be understood that any number can be used so long as redundancy information suffices to assure reliability against loss of data. Cache-extension disk region 232 may be managed using techniques known in the art and associated with log structured file (LSF) systems.

Main disk region 234 may be configured as a plurality of RAID logical units each of which may be managed as a RAID level 5 or other RAID levels. The methods and structures of the present invention are applicable regardless of the number of configured disk array groups (frequently referred to as logical units or LUNs) and regardless of the RAID level operation defined for each configured array group. Additionally, one of ordinary skill in the art will recognize that disk array 210 may be comprised of non-arrayed storage devices devoid of RAID management techniques as well as RAID managed, arrayed storage devices.

Storage may be augmented or defective disks replaced by using spares. Specifically, "spares" refers to spare disk drives commonly added to a RAID storage subsystem as disk drives ready to use as a replacement for a failed disk drive in the RAID subsystem. Such spare disk drives may be either "hot spares" (ready for immediate use by control means which switch the disk into active use) or "cold spares" awaiting manual intervention to replace a defective, active disk drive. For example, one of the cache-extension disk cache segments 235, 236 and 237 may reside physically on disk drives designated as hot spares. Cache-extension disk region 232 disk cache segments 235–237 may therefore serve a dual purpose to conserve the number of disk drives required in the arrayed subsystem. When not presently required for use as a hot spare, a disk drive containing a cache-extension disk cache segment serves to extend the segmented cache as described herein. However, if a failure in the array requires use of a hot-swap spare, the same disk drive may be used for standard storage purposes as a hot-swap device and the cache operation may revert to well known standard cache management techniques using the entire partitioned cache memory 224 as a standard cache.

Exemplary Operation of Extended Cache

Figure 3:
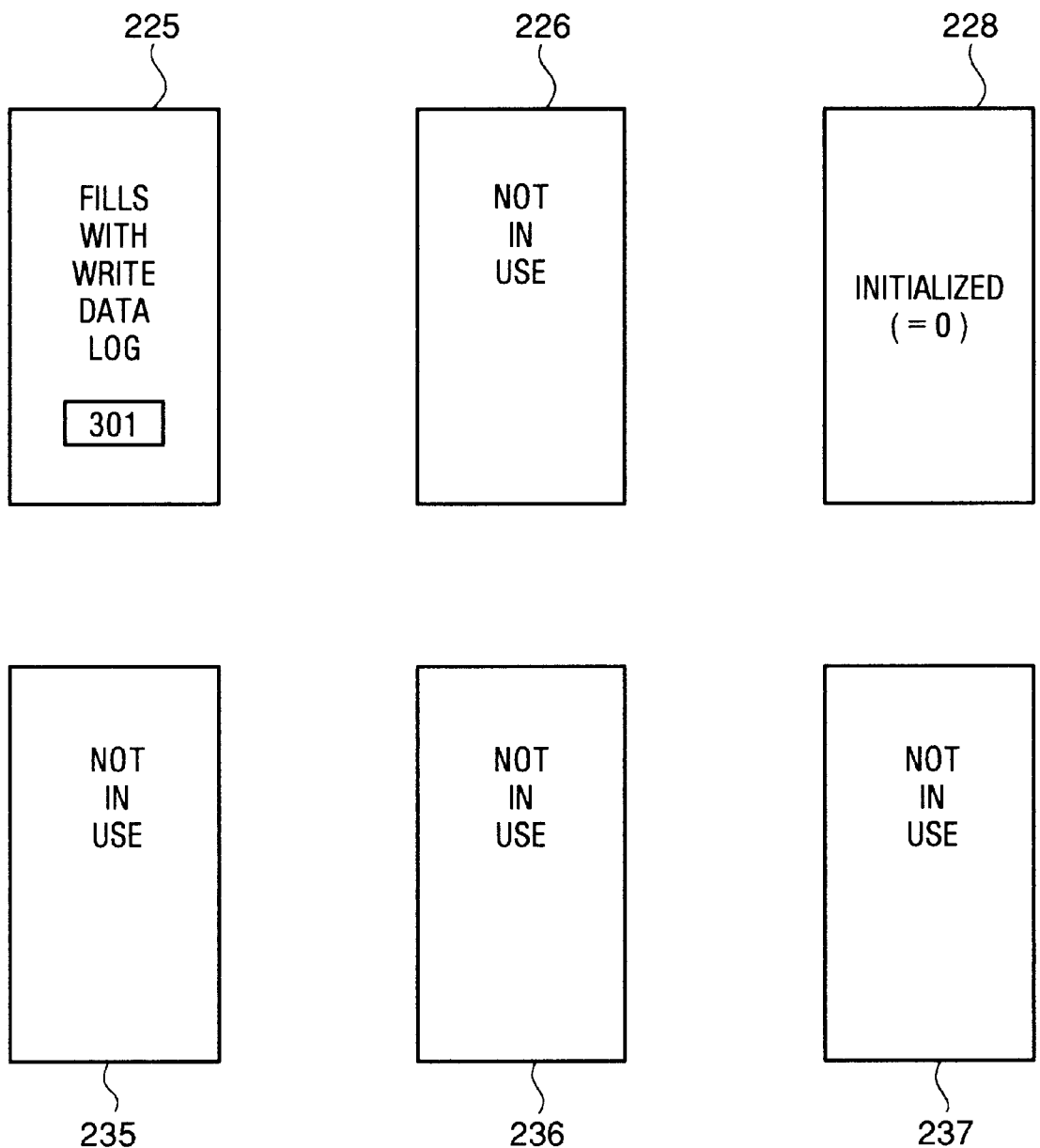
FIGS. 3–8 show the extended, segmented cache of the present invention in time sequence for implementing the basic methods of the present invention.

FIGS. 3–8 show extended cache memory of the present invention in time sequence as the basic methods of the present invention operate to utilize the write cache segments, log parity cache segment, and cache-extension disk cache segments. In particular, FIG. 3 shows a starting state of the extended cache, FIG. 4 a next state, etc. as write requests are accumulated into the log structure of the extended cache and eventually posted to main disk region 234. The same reference numerals are used throughout the figures to designate the same elements.

As shown in an initial state in FIG. 3, write cache segment 225 has been designated as the active segment and begins filling with data 301 accumulated by logging write requests from host computer 204. The process of filling a write cache segment is also referred to herein as "logging.". Write cache segment 226 is not active. Data-redundancy cache segment 228 is inactive and holds no redundancy data. If the redundancy data is parity data for example, then the data-redundancy cache segment 228 would be reset to zero at this point. The standard cache segments 230 may or may not have data at this point. The state of standard write cache segments 230 are not relevant to the operation of the methods of the present invention and are therefore not shown in FIGS. 3–8. Cache-extension disk cache segments 235, 236 and 237 are not in use at the initial state depicted in FIG. 3. Main disk region 234 is not shown because it is not involved at this moment.

Figure 4:
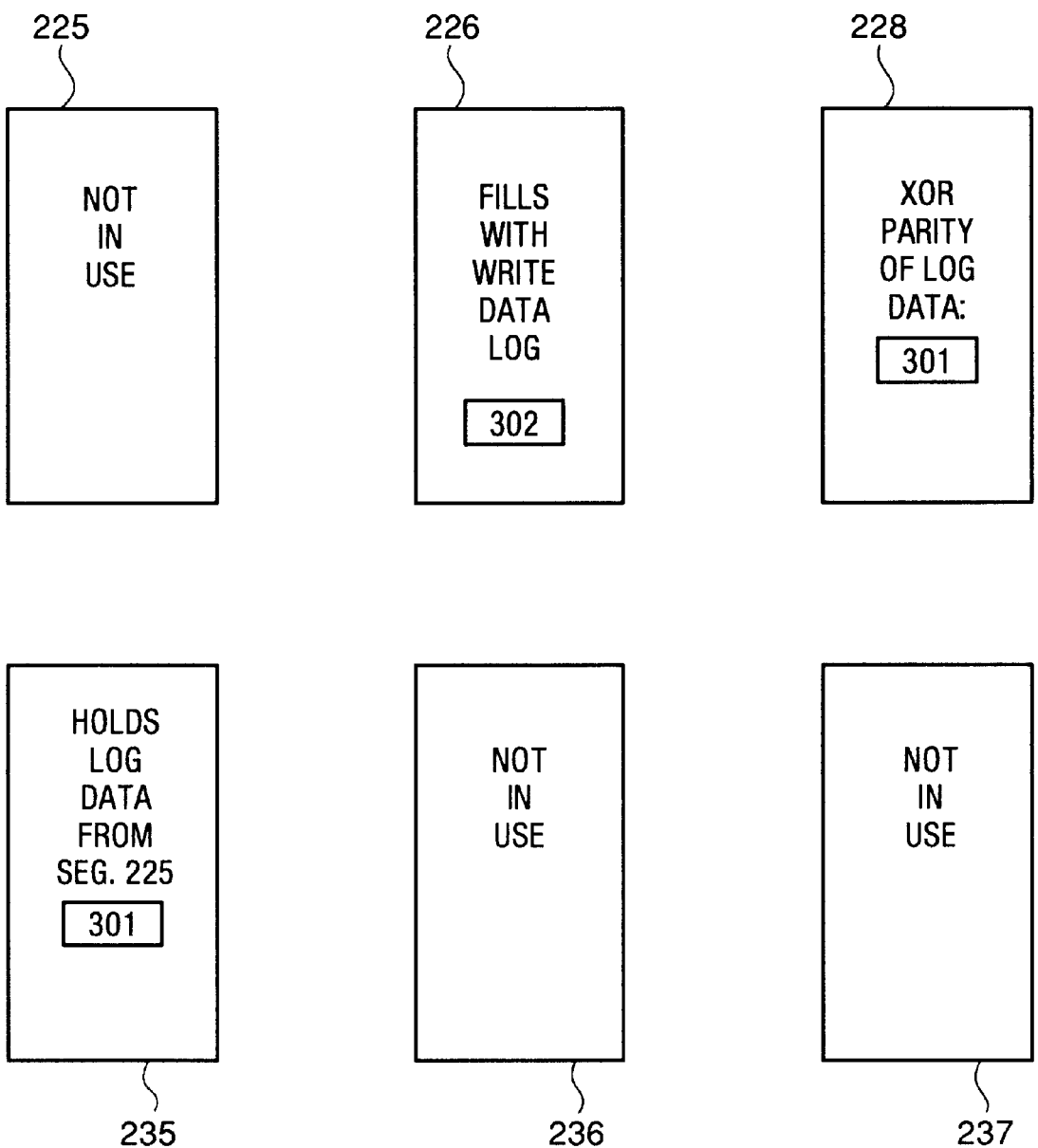

FIG. 4 shows a next relevant state of the extended cache of the present invention after write cache segment 225 has become full. Write cache segment 226 is then used for accumulating new write request data. Write cache segment 226 is shown in FIG. 4 filling with data 302 from further logged write requests. Data redundancy for data 301 is generated in data-redundancy (parity) cache segment 228. Specifically, data 301 is XORed into data-redundancy parity cache segment 228. Data 301 is then moved to cache-extension disk region 232. Specifically, data 301 is stored in an available cache-extension disk cache segment 235. Storing write requests in cache-extension disk region 232 essentially expands the storage area of partitioned cache memory 224 by using cache-extension disk region 232 to accumulate more logged write request data than would be possible with partitioned cache memory 224 alone. Furthermore, storing write requests in cache-extension disk region 232, an extension of the log structure in segments 235, 236, and 238,, as opposed to storing it in main disk region 234, allows further deferring of writing to main disk region 234 and the RAID write penalties associated therewith. Thus complexities and latencies of mapping data to main disk region 234, which may be configured as a RAID level 5, may be deferred until quieter periods. Moving logged data 301 to cache-extension disk region 232 frees write cache segment 225 for reuse.

Figure 5:
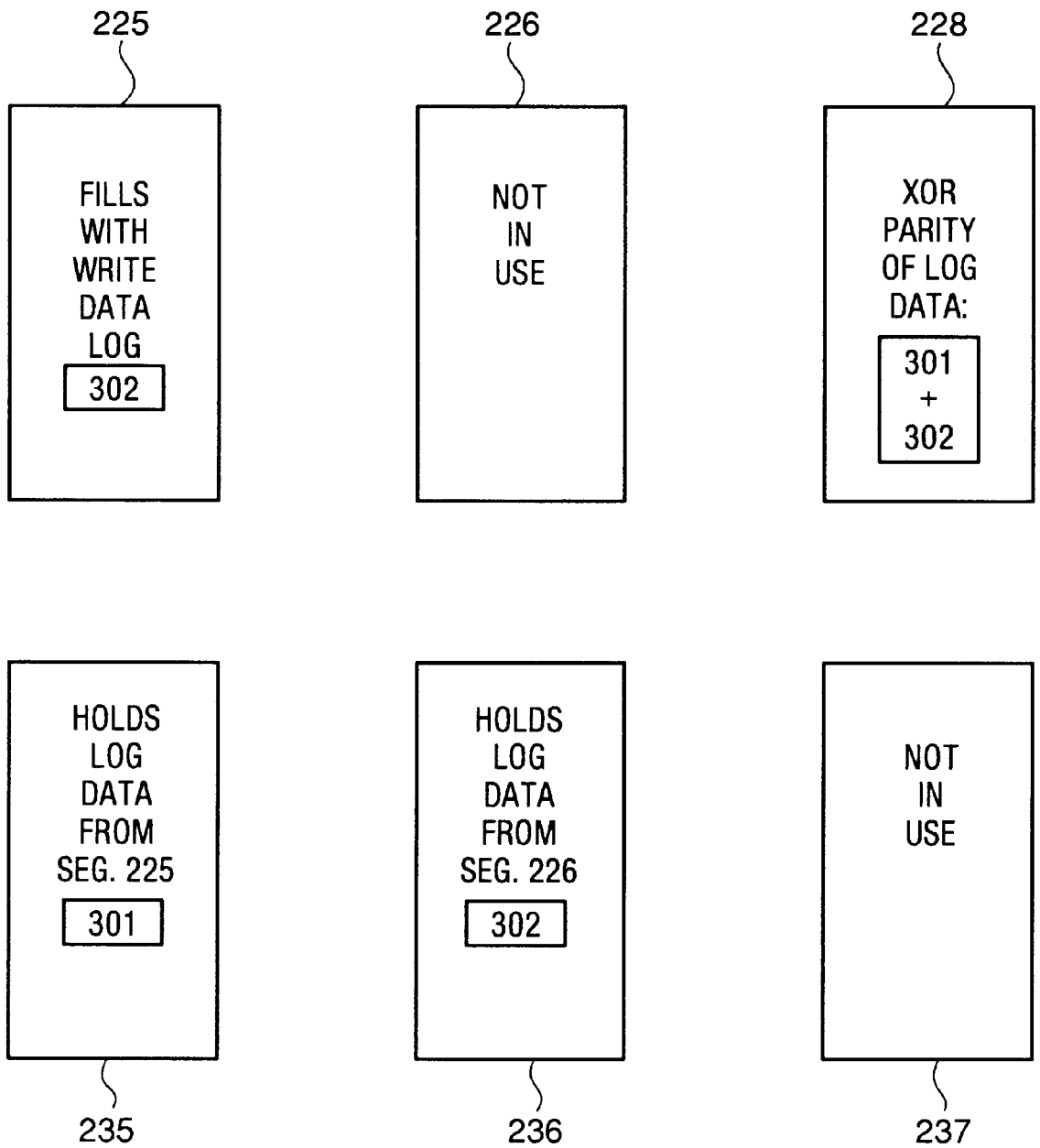

FIG. 5 shows the next relevant state after write cache segment 226 has become full and write cache segment 225 is now being reused for new write requests, for example data 303. It can be seen at this point in the sequence that write cache segments 225 and 226 are used in a ping-pong or double-buffered manner. When either segment 225 Qr 226 is full, the other is used while the first is moved to the extended disk cache segments. The filled segment is emptied and reused when the other becomes full. It is understood by those skilled in the art that this ping-pong mode helps to alleviate bottle-necks in write operations. It will be further evident to those skilled in the art that a similar circular, or other well known buffering techniques using more than two cache segments as such buffers may be equivalently applied.

Data 302 in write cache segment 226 is XORed into data-redundancy parity cache segment 228 which now contains the parity for both data 301 and 302. Data 302 is then moved to cache-extension disk cache segment 236.

Figure 6:
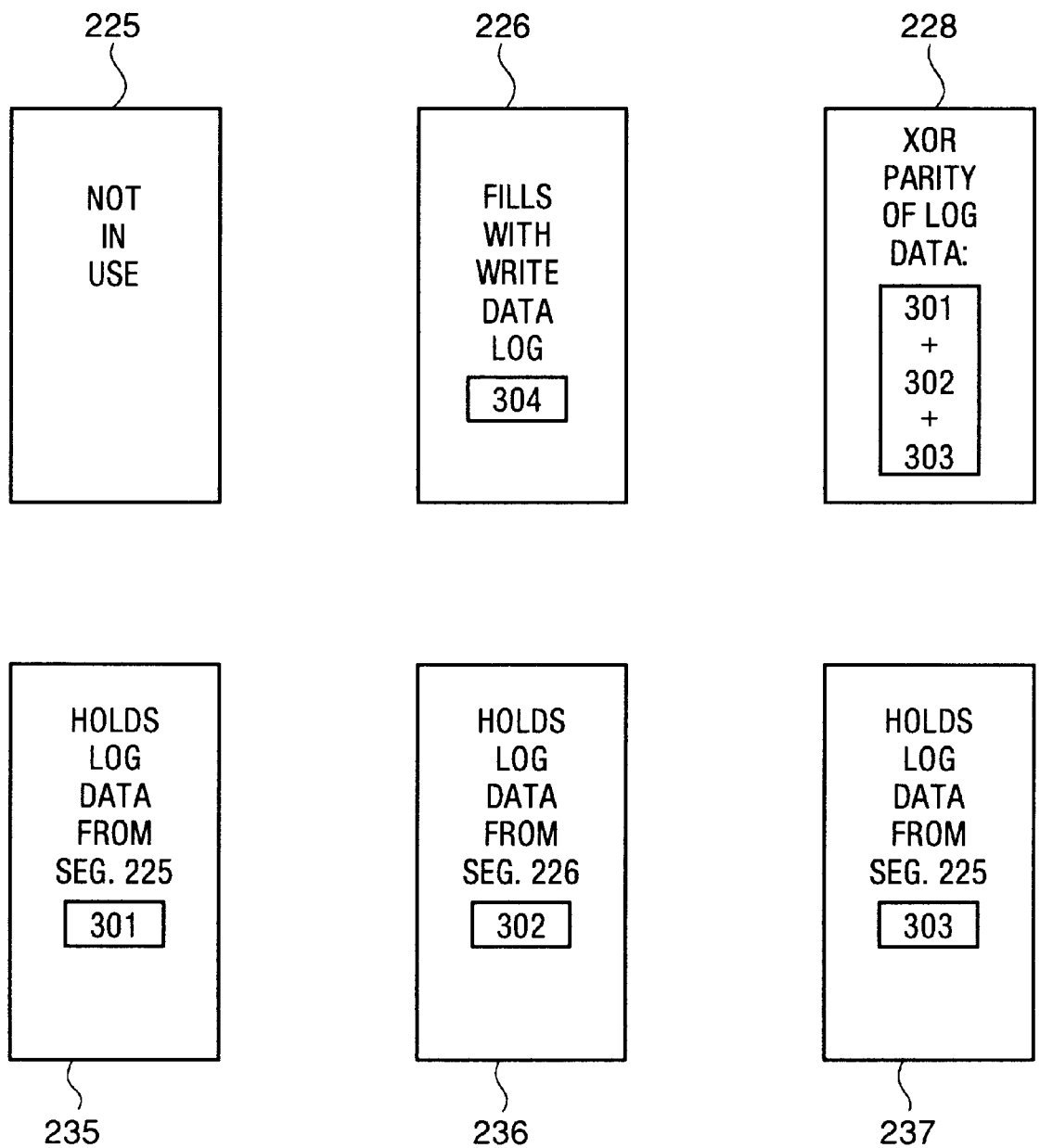

FIG. 6 shows the next relevant state of the extended cache after write cache segment 225 has again become full and write cache segment 226 is reused by filling it with data 304. Data 303 in write cache segment 225 is XORed into data-redundancy parity cache segment 228 which now contains parity data for data 301, 302 and 303. Data 303 is then moved from write cache segment 225 to cache-extension disk cache segment 237.

In the state shown in FIG. 6, cache-extension disk region 232 is full. Disk cache segments 235, 236, and 237 contain previously moved write request data 301, 302, and 303, respectively. At least one disk cache segment in the cache-extension disk region 232 needs to be flushed (posted) to main disk region 234 so that the extended cache may continue accepting new write request data.

Figure 7:
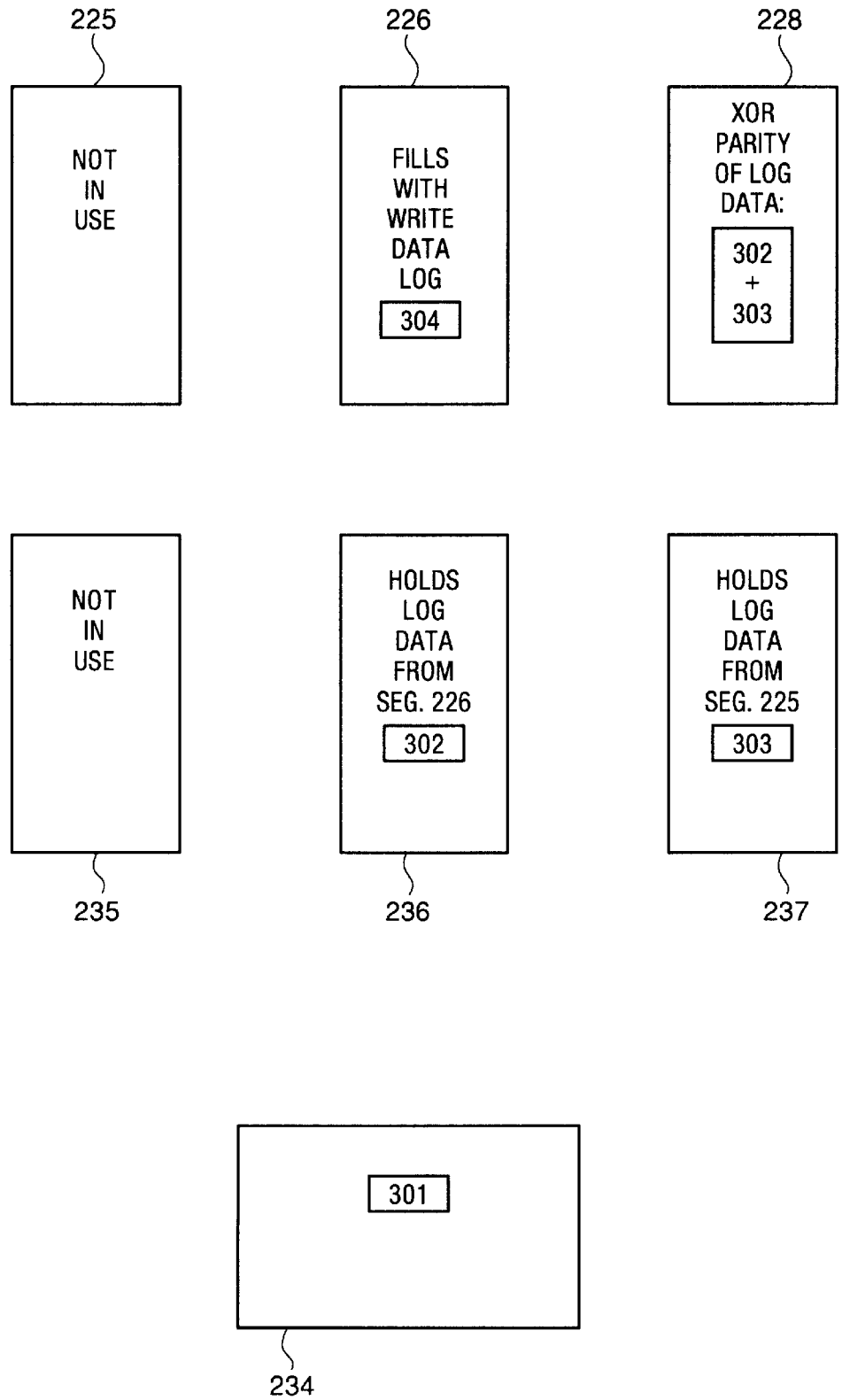

FIG. 7 shows the next relevant state of the extended cache after data 301 has been posted from cache-extension disk cache segment 235 to main disk region 234 in accordance with the RAID storage management applied to main disk region 234. To accomplish this, data 301 is read from cache-extension disk cache segment 235 into controller 202 memory buffers (e.g., within memory buffers of CPU 220). The contribution of data 301 to parity is subtracted out of the data-redundancy parity cache segment 228 (by standard XOR computations).

Any overwrites that may have occurred in more recent write requests, such as write requests logged in data 302, 303 and 304, must be invalidated within data 301. Overwrites are any changes in earlier logged data (e.g., data 301) that may have been written by host computer 204 in the more recent write requests (i.e., logged in data 302–304). The remainder of first write request data, (i.e., that which was not overwritten), is then posted to main disk region 234. Cache-extension disk cache segment 235 is then freed for reuse. This allows new write request data to be moved from write cache segments 225 and 226 to cache-extension disk cache segment 235.

Figure 8:
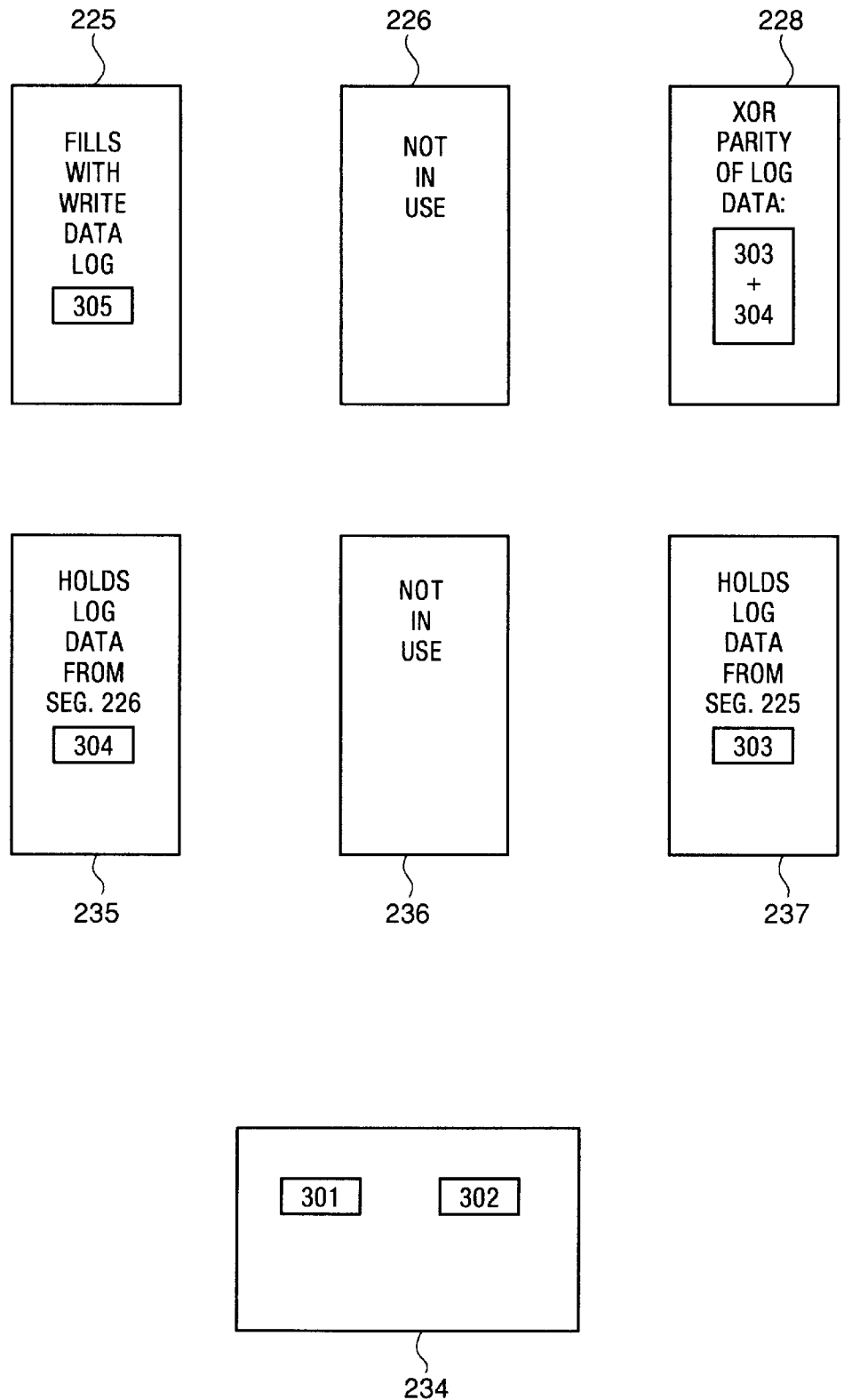

FIG. 8 shows a next relevant state of the extended cache in which data 304 has been moved to cache-extension disk cache segment 235 and data 302 has been posted to main disk region 234. Write cache segment 225 is being filled with data 305. Data 302 is posted from cache-extension disk cache segment 236 to main disk region 234 in a similar fashion described for posting of data 301 to main disk region 234. That is, it is read from cache-extension disk cache segment 236, its contribution to parity is subtracted from data-redundancy cache parity segment 228, and any overwrites that may have occurred in more recently logged data are invalidated in the segment to be posted, and the data is written to main disk region 234.

Figure 14:
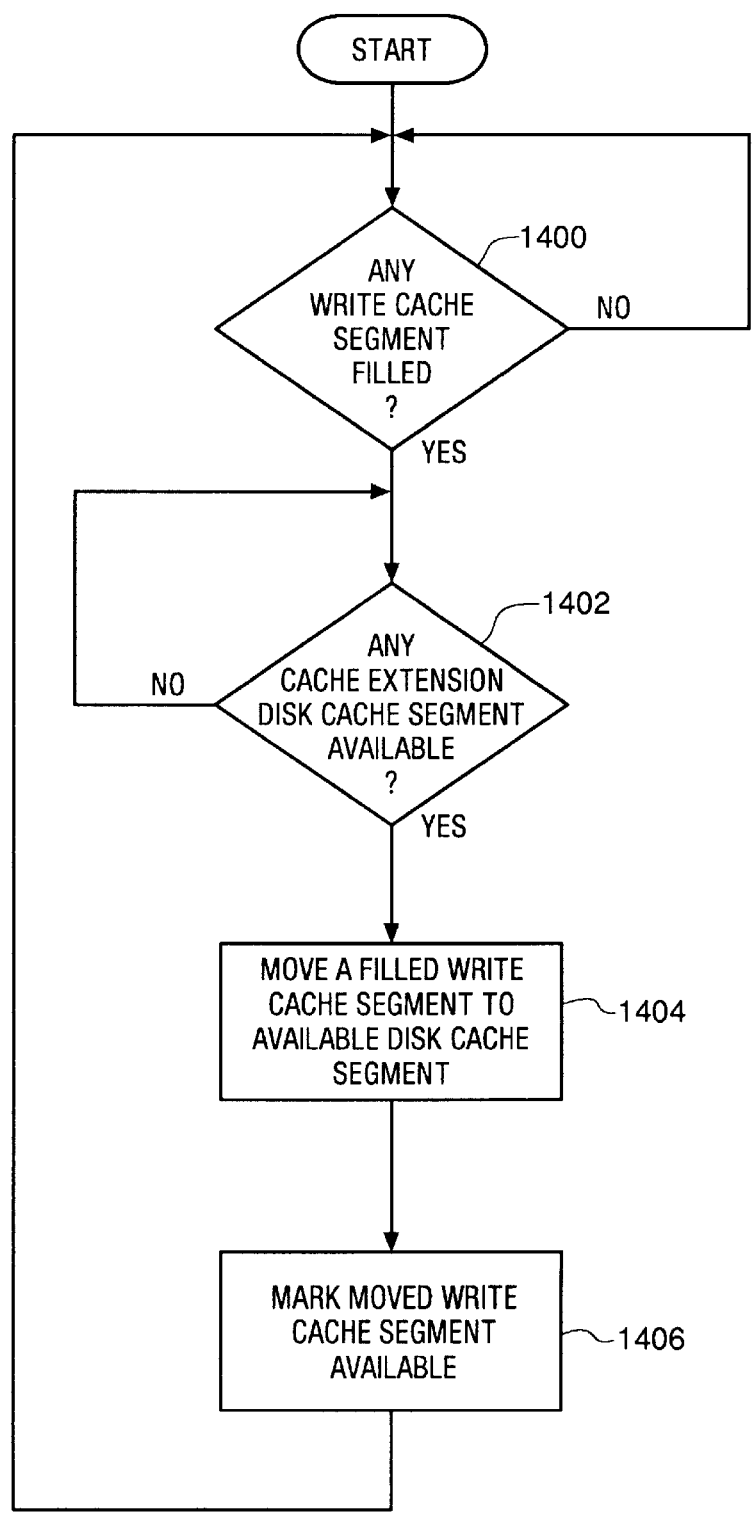
FIG. 14 is a flowchart describing the methods of the present invention to move filled log structured write cache segments generated by operation of the method of FIG. 9 into cache extension disk cache segments to await posting to the main disk region.
Figure 15:
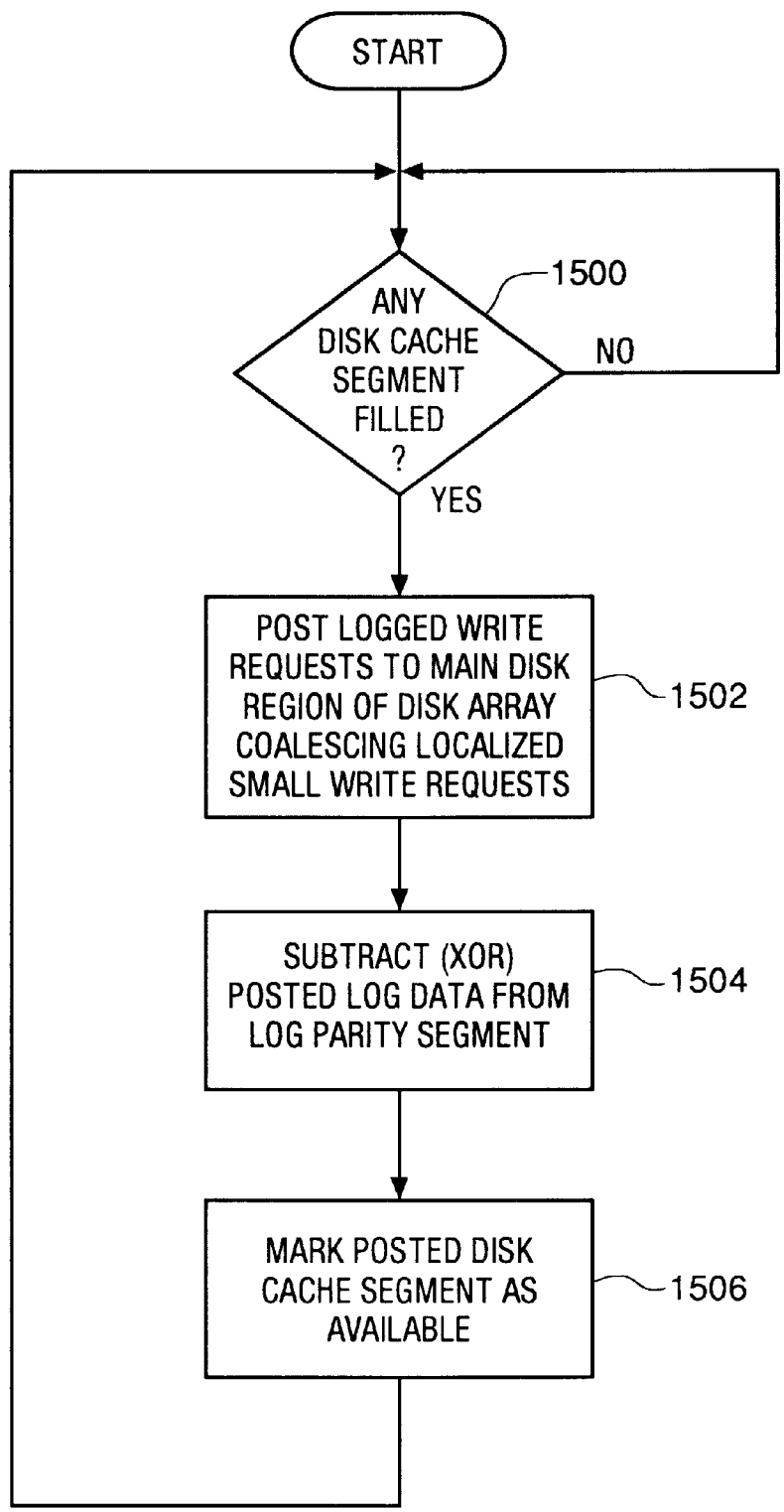
FIG. 15 is a flowchart describing the methods of the present invention to post (flush) logged data from the log structured disk cache segments to the main disk region in accordance with storage management techniques applied thereto.
Figure 16:
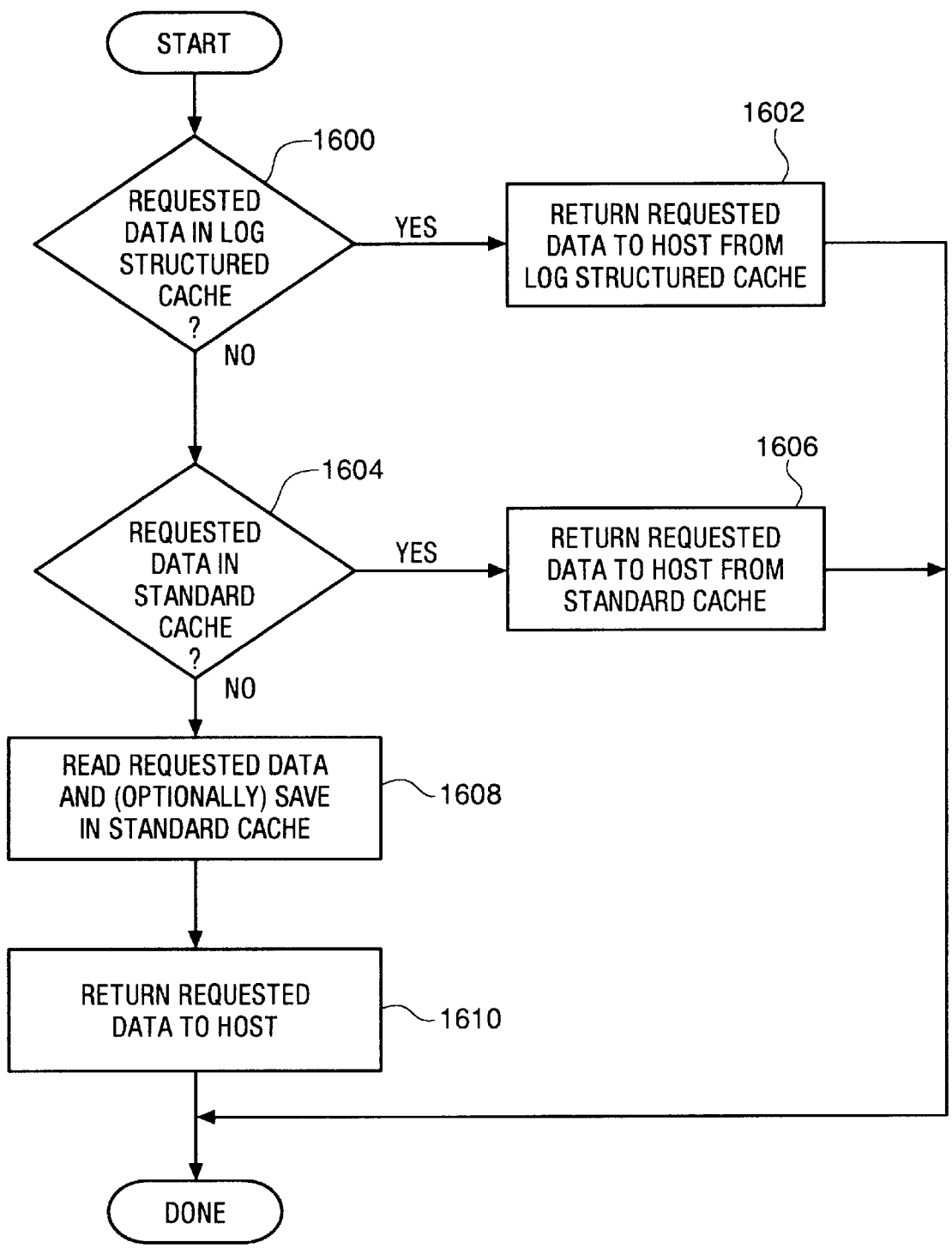
FIG. 16 is a flowchart describing the methods of the present invention to alter reading of data to check the log structured cache memory in addition to standard cache segments when processing read requests.

FIGS. 9, 14, 15, and 16 are flowcharts describing methods of the present invention. In particular, FIG. 9 describes the methods of the present invention operable to log incoming write requests in write cache segments of the cache memory 224. FIG. 14 describes a method of the present invention operable concurrently with that of FIG. 9 to move filled write cache segments from cache memory 224 into the cache-extension disk region 232 of the disk array 210. FIG. 15 describes another method of the present invention operable concurrently with that of FIGS. 9 and 14 to post (flush) logged write requests to the main disk region 234 of disk array 210 in accordance with the storage management techniques applied thereto (e.g., RAID storage management). FIG. 16 describes methods of the present invention which alter standard read request processing in view of the log structured cache of the present invention.

Figure 9:
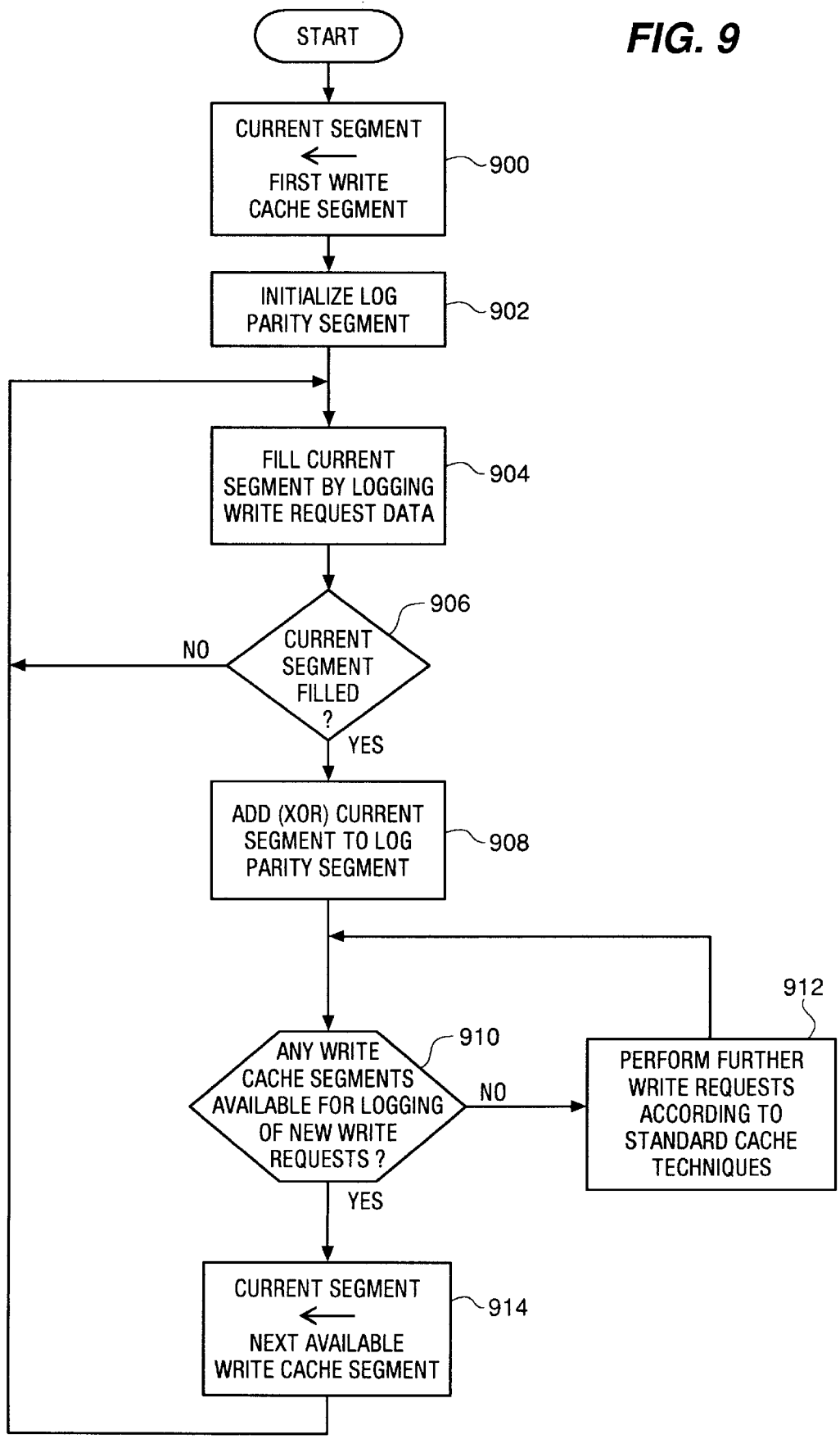
FIG. 9 is a flowchart describing the methods of the present invention operable within a storage subsystem controller to log write requests in partitioned extended cache.

Element 900 of FIG. 9 is first operable to initialize a pointer to the current segment (also referred to herein as an active segment). The current segment is set to point to the first available write cache segment (225 or 226 since both are available initially). Element 902 then initializes the log parity segment 228 to reset the parity computation (the parity segment is reset to zeros for XOR parity operation).

Elements 904 and 906 are then repeatedly operable to fill the current segment by logging received write requests in the current segment. Specifically, element 904 receives write requests from attached host systems and logs required information in the log structure of the current segment. As noted above, well known log structured file system management techniques are applicable to the log structure maintenance of the segments of the partitioned cache memory 224. Element 904 is further operable to invalidate any data in the standard cache segments 230 which is invalidated by the data supplied in the logged write requests. Element 906 determines whether the current segment is filled. If not, processing continues by looping back to element 904.

Element 908 is operable in response to filling the current segment with logged write requests. Element 908 adds (using well known XOR parity arithmetic) the logged data in the current segment into the log parity segment 228. As noted elsewhere herein, the log parity segment 228 helps assure the integrity of the data stored in the log structured extended cache. Loss of a data in a single segment of the cache (including the extended cache disk segments) can be recovered through the parity computations.

Element 910 is next operable to determine if another write cache segment (225 or 226) is presently available to continue receipt and logging of write requests. If no other write cache segment is presently available, element 912 is operable to continue write request processing by the controller (202) but in accordance with standard caching techniques using the standard cache segments 230 of cache memory 224. As noted above, standard cache management techniques are modified to detect possible overwriting of data saved in the log structure. Data associated with such overwritten requests is invalidated in the log structure of the extended cache. Processing of write requests by element 912 in accordance with standard cache techniques continue by repetitive execution of element 910 and 912 until a write cache segment (225 or 226) is again available.

Element 914 is then operable in response to availability of a write cache segment to set the current segment pointer to the next available write cache segment (225 or 226). Processing then continue by looping back to element 904 to fill the new active segment. Concurrent background processing discussed below processes the write cache segments by moving them to the cache extension disk region and/or posting the logged write requests to the main disk region.

FIG. 14 describes background processing operable concurrently with that of FIG. 9 to move filled write cache segments (225 or 226) to disk cache segments (235–237) of cache extension disk region 232. Filled cache segments are moved to the cache extension disk region 232 to make room in the faster cache memory 224 to log additional write requests. The size and number of segments (235–237) in cache-extension disk region 232 may be easily scaled up or down to adapt to particular environments and performance goals.

Element 1400 is first operable to await the filling of any write cache segment (225 or 226). Once a segment is detected as filled, element 1402 then awaits availability of a disk cache segment (235–237) in the cache extension disk region 232. Element 1404 is then operable in response to detecting an available disk cache segment to move the filled write cache segment contents into the available disk cache segment. Element 1406 then marks the moved write cache segment as again available. As noted above, processing in FIG. 9 reverts operation of the subsystem cache to well known techniques if the write cache segments remained filled too long awaiting moves to the cache extension disk region 232 by processing of FIG. 14 described above. Processing by elements 1400–1406 then continues in an iterative fashion to move any filled write cache segments (225 or 226) into an available disk cache segment (235–237).

FIG. 15 describes further background processing operable concurrently with that of FIGS. 9 and 14 to post (flush) to the main disk region 234 logged write requests in filled write cache segments (225 or 226) and/or disk cache segments (235–237) of cache extension disk region 232. Preferably the posting operations of the method of FIG. 15 are performed during otherwise idle periods in the storage subsystem. Filled cache segments are moved to the cache extension disk region 232 to make room in the faster cache memory 224 to log additional write requests. Eventually, processing of FIG. 15 processes each of the logged write requests in the filled segments to post the data therein to the main disk region in accordance with the storage management techniques applied thereto (e.g., RAID management).

Element 1500 is first operable to await the filling of any disk cache segment (235–237). Once a segment is detected as filled, element 1502 processes the logged write requests contained therein. Preferably the entire disk cache segment is read from d the disk in a single large read operation to maximize performance of element 1502 processing. The log structured information associated with the filled segment includes the data to be written by the write request as well as parameters required to perform the write to the main disk region (e.g., volume ID or LUN and logical block address therein). In particular, as is known in managing log structured file systems, element 1502 coalesces small write requests to increase the size of data blocks written to the main disk region 234. For example, small writes that might otherwise require a costly read-modify-write (RMW) process in a RAID level 5 LUN may be coalesced to utilize a full RAID stripe write or multiples thereof in writing the logged requests to the main disk region.

Element 1502 is further operable to detect any invalidated write requests within the logged requests before coalescing and posting the data. As noted above, logged write requests may be invalidated, for example, by overwriting of the associated data later received (and logged) write requests.

Element 1504 is then operable in response to completing the posting of the logged write requests in the filled segment. Element 1504 subtracts (using XOR parity arithmetic) the contribution of the posted segment from the log parity segment 228. The log parity segment is no longer required to assure integrity of the logged write requests. Rather, the logged write requests are now posted to the main disk region 234 where the data integrity is assured by other storage management techniques (e.g., RAID management). Element 1506 then marks the posted disk cache segment as again available. As noted above, processing in FIG. 9 reverts operation of the subsystem cache to well known techniques if the disk cache segments and hence the write cache segments remained filled too long awaiting posting to the main disk region 234 by processing of FIG. 15 described above. Processing by elements 1500–1506 then continues in an iterative fashion to post any filled disk cache segments (235–237) into main disk region (234).

FIG. 16 describes methods of the present invention as they modify standard read request processing. A read request must now locate the requested data in either the log structured cache (the extended cache memory) or in the standard cache before determining that the requested data must be read from the disk array 210. FIG. 16 therefore describes the processing of a read request as modified by the log structured cache operation of the present invention.

Element 1600 first determines whether the requested data is available in the standard cache segments of the extended cache memory. If all the requested data is so located, element 1602 is operable to return the requested data from the standard cache segments of the extended cache memory to the requesting system. Such standard cache processing of read requests is well known to those skilled in the art. As noted above with respect to element 904, when new write requests are added to the log write segments of the extended cache, contents of the standard cache which are thereby affected are invalidated. Therefore, if the data is not found in the standard cache, as determined by operation of element 1600, the data may be located in the log structured write segments and disk segments of the extended cache. In this case elements 1604 and 1606 are next operable to locate the requested data in the log write segments of the extended cache in accordance with log structure management techniques. Specifically, element 1604 determines if the requested data within the collection of logged write requests in the log structure of the write cache segments or the associated disk segments of the extended cache. If so located, element 1606 is then operable to return the requested data to the host system from the log structured extended cache. Optionally, element 1606 may also process the located data so as to enter it into the standard cache segments for possible future read requests.

If the requested data is not located in either the standard cache segments or the log structured extended cache segments, elements 1608 and 1610 are operable to read the requested data from the disk array 210 and to optionally save the read data in the standard cache segments 230.

Those skilled in the art will recognize that the methods of FIG. 16 are intended to suggest modifications of standard read request processing in a cached storage controller to utilize the log cache structure of the extended cache memory of the present invention. In particular, the method of FIG. 16 may be modified to recognize that portions of the requested read data may be located in one of the cache areas (e.g., part in the log structured cache and/or part in the standard cache segments) while other parts may be read from the disk array. The flowchart of FIG. 16 is therefore intended only to suggest the modifications useful in a standard read request process. In addition, data located in the log structured cache may invalidated by later overwrites as noted above. Locating data in the log structured cache as in element 1600 therefore includes determining which data in the log structure is valid or invalidated.

Alternate Embodiments

A number of variations of the embodiment described above will be recognized by those skilled in the art. In particular, scaling of the number of segments in combination with management of the associated log parity segments can further enhance both the performance and capacity of the extended cache of the present invention. FIGS. 10–13 present alternate embodiments in which the extended cache segments are enhanced and configured so as to improve various performance characteristics of the log structured extended cache.

Figure 10:
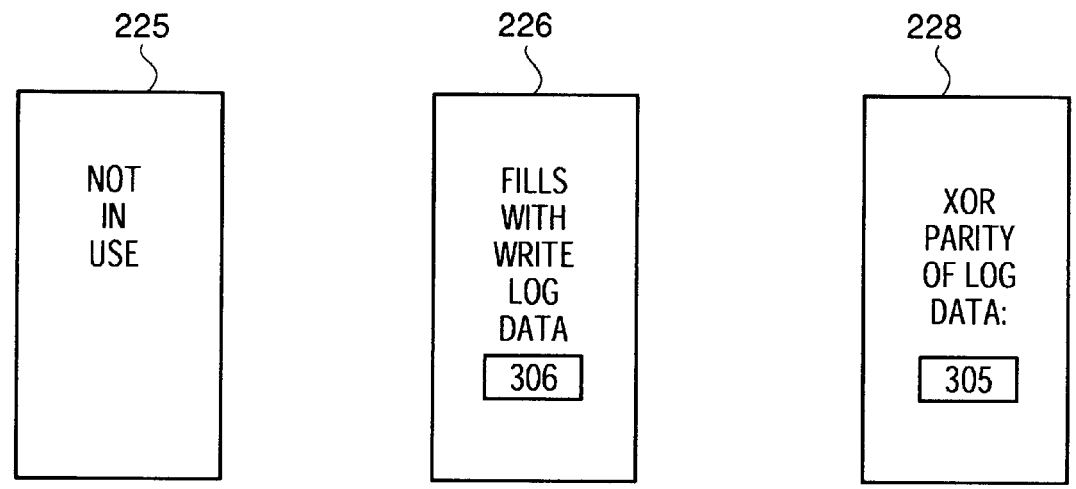
FIGS. 10–13 show alternative embodiments of the present invention with more complex mapping of the extended cache segments to improve performance of the log structured extended cache.
Figure 10:
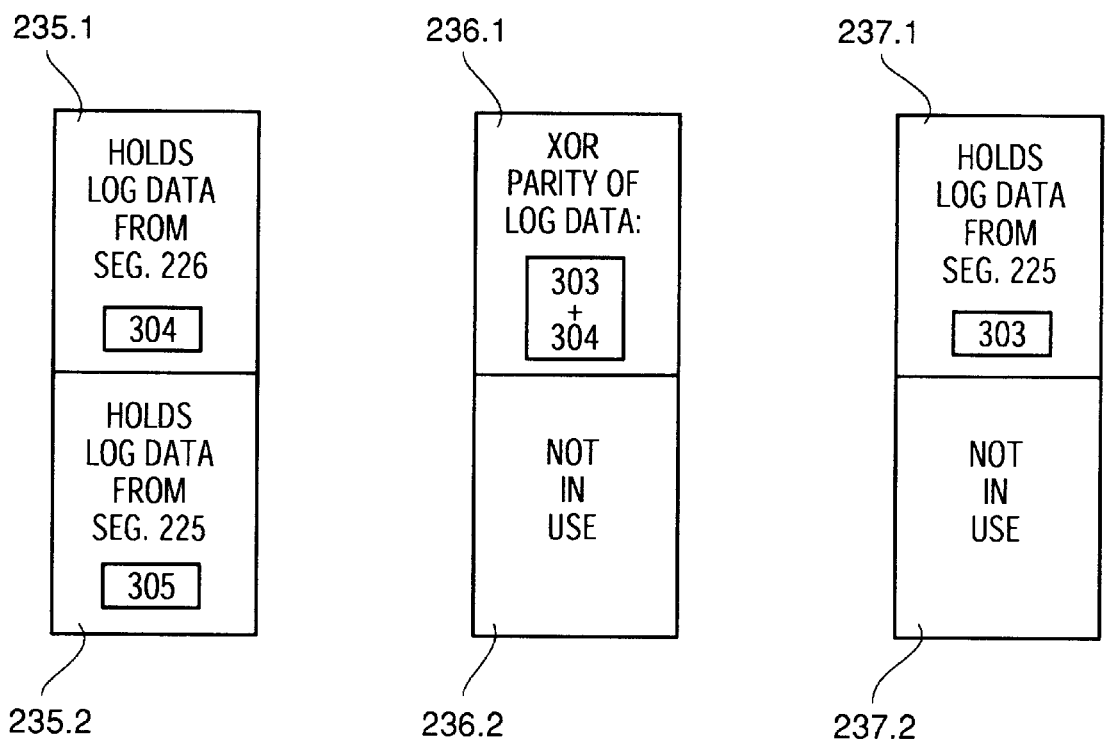

FIG. 10 describes an exemplary alternative embodiment of the log structured extended cache of the present invention in which the number of disk segments in the log structured extended cache is increased. The increased number of disk segments allows additional logged write requests to be accumulated in the extended cache log structures of the present invention before the RAID write penalty need be incurred.

The increased number of disk segments preferably includes additional log parity segments within the disk segments to allow parity protection of data in the extended cache. In particular, disk segments 235.1, 236.1, and 237.1 may be viewed as a first "stripe" of the disk portion of the cache extension disk region 232. Disk segments 235.2, 236.2, and 237.2 comprise a second "stripe" of the disk region 232. These logical groupings are "stripes" in the sense that reliability of logged data in the disk segments is assured by an associated parity portion (as is known in RAID management techniques generally). Disk segment 235.1 and 237.1 hold data 304 and 303, respectively, which had been previously accumulated in write segments 226 and 225, respectively. As these segments were accumulated and written to the disk region 232 of the extended cache, log parity segment 228 had retained a parity computation to assure against data loss of the accumulated write segments as written to disk. Once the data log write segments were flushed to disk segments 235.1 an 237.1, the log parity segment representing the XOR sum of the data 303 and 304 is written to disk segment 236.1. Log parity segment 228 is then freed for further use in accumulating parity for further write segment log accumulation. Disk segments 235.1, 236.1, and 237.1 are thereby secure from data loss due to a failure of any one of those disk segments. These disk segments may therefore be viewed as a stripe as is known in RAID management techniques.

Further write request data 305 is then accumulated and written to disk segment 235.2. Log parity segment 228 accumulates the XOR parity of the next stripe of logged write requests written to disk segments. Write segment 226 continues to accumulate additional write request data. Log parity segment 228 accumulates XOR parity for write segments as they fill until a second stripe is filled and written to the disk region 232. In particular, disk segments 235.2, 236.2, and 237.2 may therefore be viewed as a second stripe of logged write requests in the disk region 232 of the extended cache.

Those skilled in the art will recognize that FIG. 10 represents a single frozen state of the extended, partitioned cache of the present invention. Earlier and later states of the extended cache will be readily recognized and determined by those skilled in the art.

Figure 11:
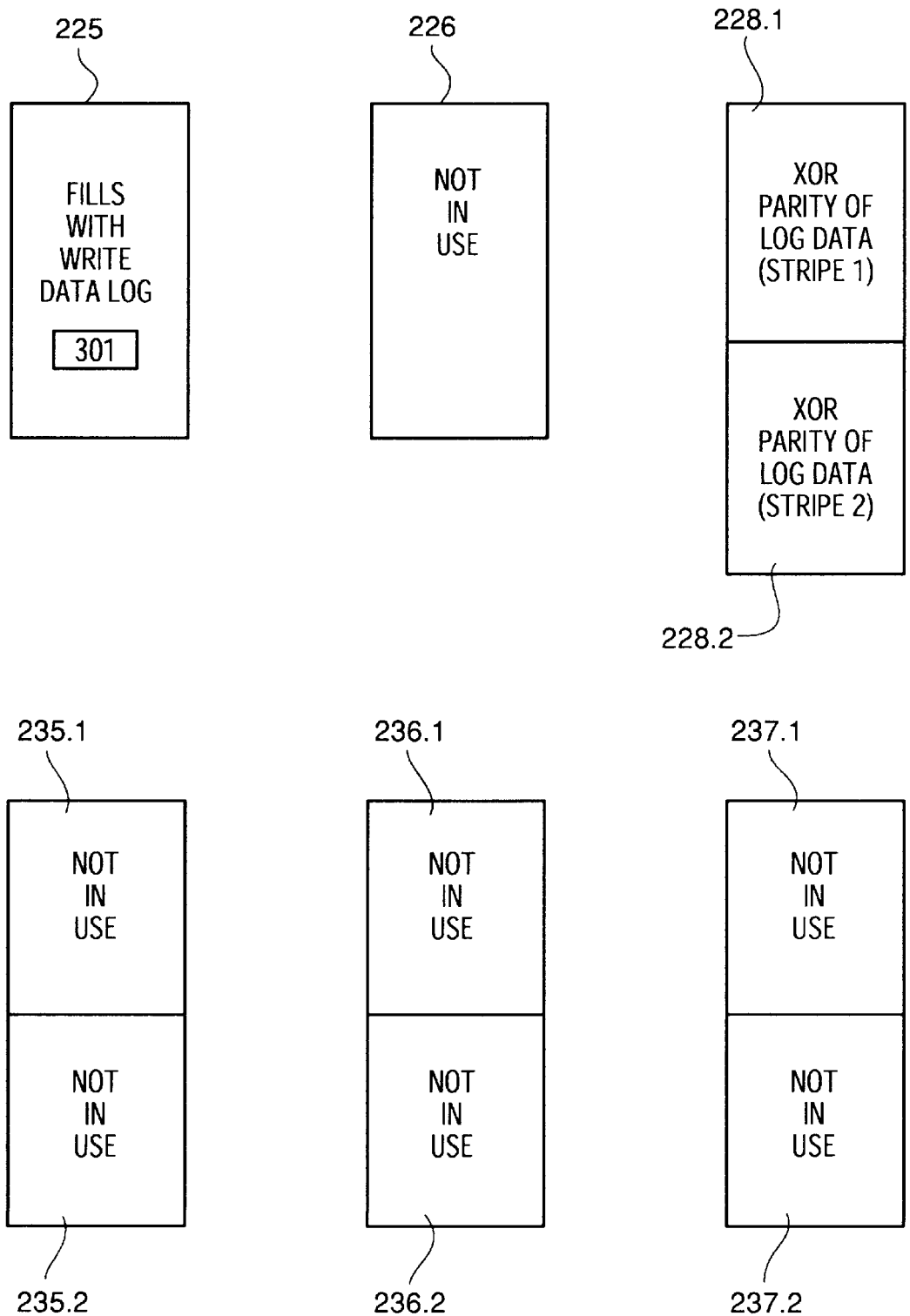

FIG. 11 depicts another exemplary alternative embodiment of the partitioned, extended cache of the present invention. The structure described by FIG. 10 is identical to that of FIG. 11 but for provision of additional log parity segments in the cache memory. Specifically, two log parity segments 228.1 and 228.2 are shown. As noted above with respect to FIG. 10, a log parity segment (e.g., 228.1) accumulates XOR parity for logged write data accumulated in write segments 225 and 226. The log parity segment corresponding to the "stripe" of logged write requests in the disk region 232 is written to disk (as shown in FIG. 10) to secure the stripe against data loss as additional write request data is logged. The log parity segment is locked in the cache memory during the period of time required to record it on the disk region. Addition of a second log parity segment (e.g., 228.2 of FIG. 11) allows other parity operations to be performed while the previous log parity segment (e.g., 228.1) is being written to the disk region 232. Multiple log parity segments 228.1 and 228.2 are used in a "ping-pong" (or more generally circular) manner to avoid waiting for a locked common resource and to thereby further increase subsystem performance. Specifically, accumulation of additional write request data need not await completion of the writing of a previously computed log parity segment to the disk region 232 of the extended cache.

Figure 12:
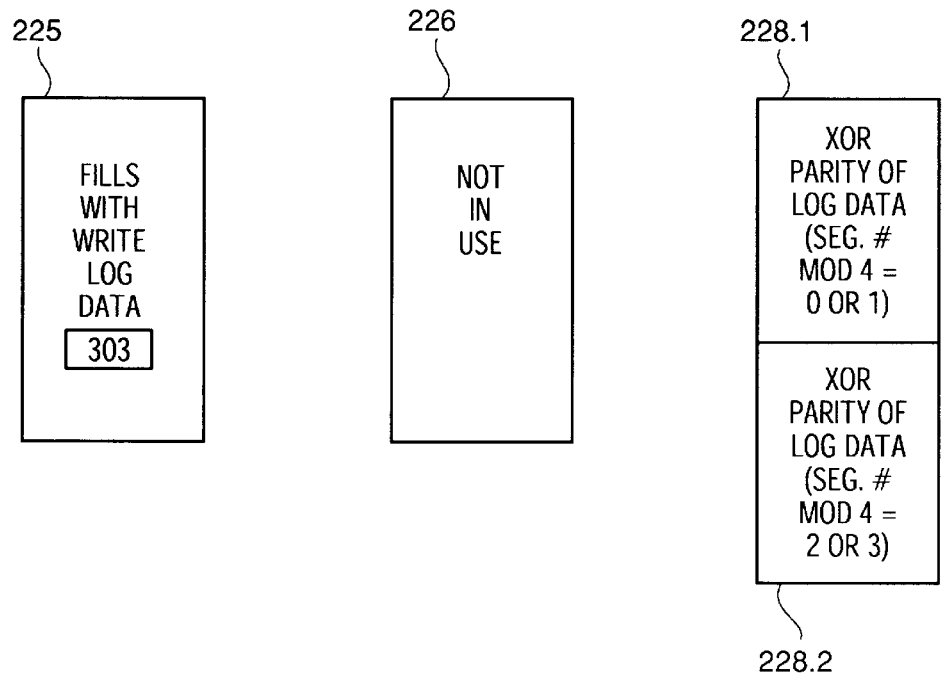
Figure 12:
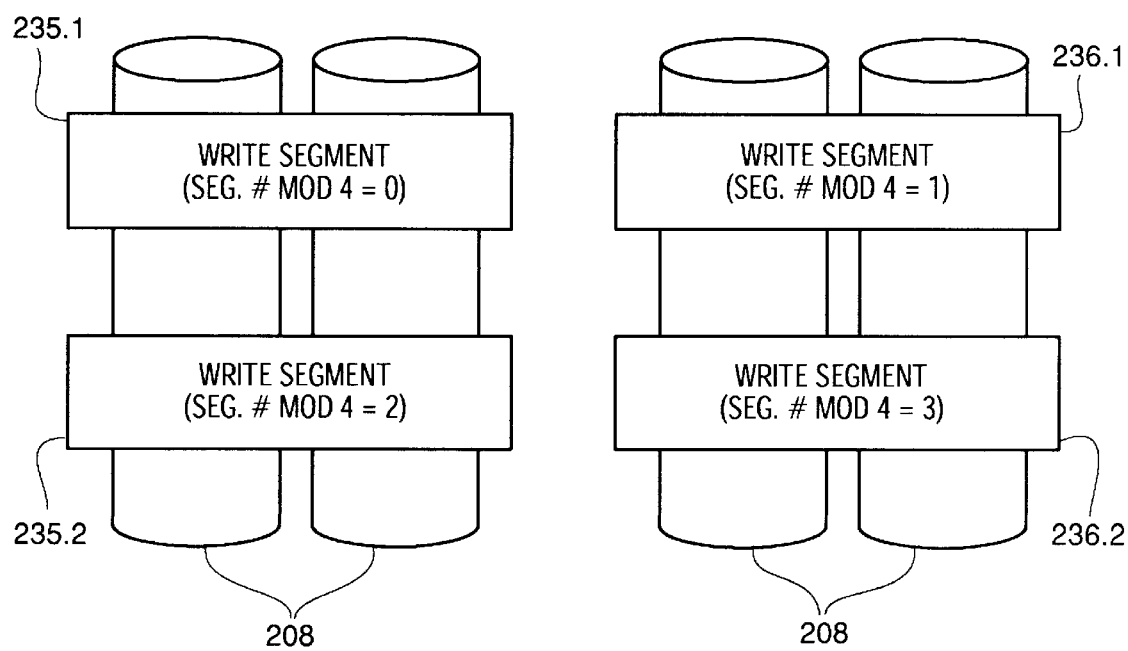

FIG. 12 describes yet another alternative embodiment wherein the distribution of disk segments 235.1, 235.2, 236.1, and 236.2 is such that the speed of transfer of write segments (e.g., 225 and 226) is improved by using multiple disk drives 208 for parallel data transfers. Specifically, the architecture depicted in FIG. 12 is similar to that of FIG. 11 except that the disk segments are distributed over a plurality of disk drives 208 to improve the transfer rate of write segments to disk segments. Segment 235.1 is distributed over sections of two disk drives 208 as are segments 235.2, 236.1, and 236.2. It is important to note that the disk segments must be distributed over the disk drives in such a manner as to assure reliable recovery of any data lost by failure of a single disk drive. As is known in RAID management techniques, the log parity segment associated with disk segments in a "stripe" (e.g., 228.1 in association with 235.1 and 236.1) can only assure recovery of loss of a single segment. Disk segments 235.1 and 236.1 (associated with log parity segment 228.1) are therefore distributed over distinct disk drives. Likewise, disk segments 235.2 and 236.2 are distributed over distinct disk drives with respect to one another so as to assure recovery of lost data by the associated log parity segment 228.2.

More generally, as shown in FIG. 12, log parity segment 228.1 provides parity redundancy information for the first and second of each sequence of four write segments filled in write segments 225 and 226 (i.e., segment index number mod 4 is 0 or 1). Log parity segment 228.2 provides parity redundancy information for the third and fourth of each sequence of four write segments filled in write segments 225 and 226 (i.e., segment index number mod 4 is 2 or 3). Disk segment 235.1 is used for the first of such four sequential write segments moved to the disk region, 235.6 for the second, 235.2 for the third, and 236.2 for the fourth. Such a mapping assures that loss of any single disk drive 208 will not loose any logged write request data.

Figure 13:
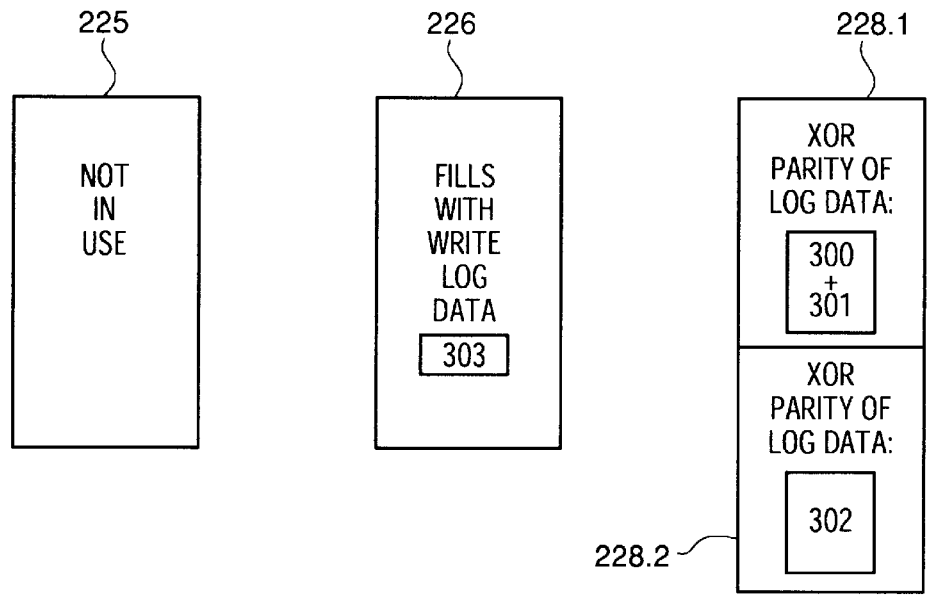
Figure 13:
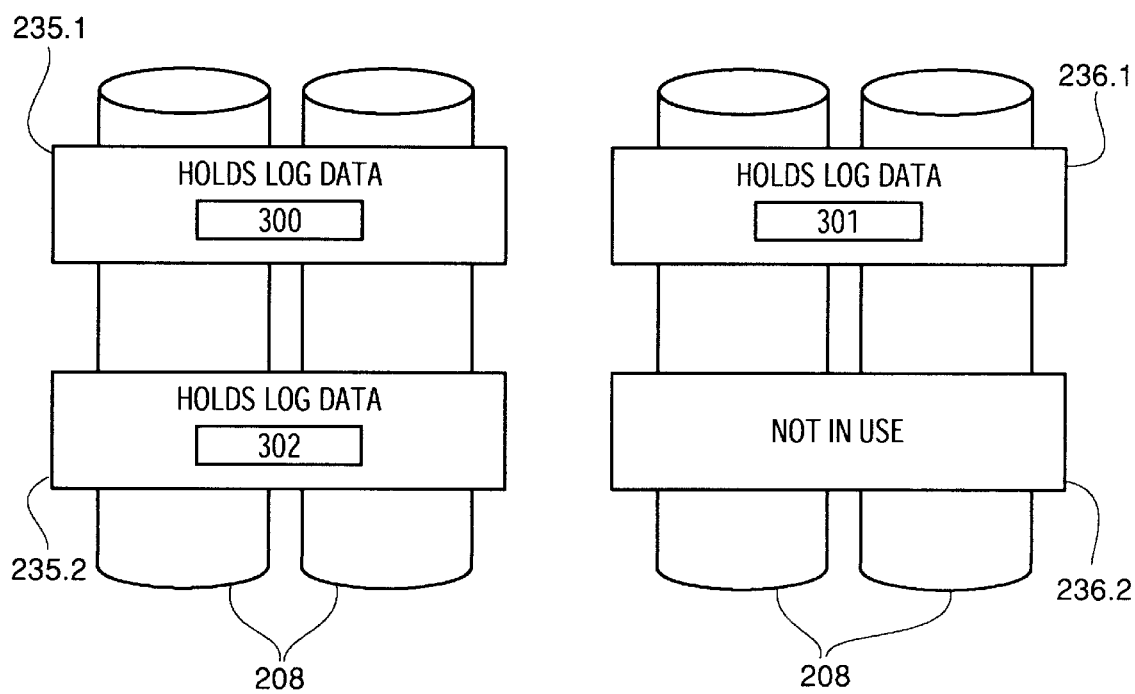

FIG. 13 shows a specific exemplary state in operation of the embodiment represented by FIG. 12. In particular, log parity segment 228.1 contains parity for data 300 and 301 which are stored in a stripe on the disk region in disk segments 235.1 and 236.1. Log parity segment 228.2 stores the parity information for data 302 which is stored in the associated stripe disk segment 235.2. Write segment 226 is currently active filling with data 303. When filled, data 303 in write segment 226 will be moved to disk segment 236.2 in association with disk segment 235.2 and log parity segment 228.2. The first stripe (disk segments 235.1 and 236.1 with log parity segment 228.1) and the second stripe (disk segments 235.2 and 236.2 with log parity segment 228.2) are both secure from loss of logged write request data dues to failure of any single disk drive 208.

Those skilled in the art will recognize many variations and combinations of the options described in alternate embodiments of FIGS. 10–13. In particular, the number, types, and distribution of such extended cache segments may vary in numerous respects within the intended scope of the present invention and in accordance with the performance needs of a particular application environment. Even more specifically, the segmentation (number, type, and distribution of the cache segments) is preferably logical rather than physical in nature and may therefore be dynamically adjusted in response to changes in the application environment or performance goals.

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. A method of utilizing cache memory in a disk storage subsystem to improve write operations, said method comprising the steps of:
   a) partitioning said cache memory to logically define a plurality of log-structured write cache segments and at least one redundancy-data cache segment;
   b) partitioning disk space in said subsystem to logically define log-structured cache region having at least one disk segment;
   c) logging first write request data corresponding to received write requests in a first segment of said plurality of write cache segments until said first segment is full;
   d) logging further write request data corresponding to received write requests in a second segment of said plurality of write cache segments in response to said first segment being full;
   e) accumulating, in said redundancy-data cache segment, redundancy data corresponding to said first write request data;
   f) moving said first write request data from said first write cache segment to one of said at least one disk segment in response to accumulating said redundancy data; and
   g) repeating steps c) through f) where said second segment is used as said first segment.

2. The method of claim 1 wherein said disk space includes a main disk region distinct from said log-structured cache region for persistent storage of data and wherein the method further comprises the steps of:
   determining to flush said first write request data from said one of said at least one disk segment to said main disk region;
   reading said first write request data from said one of said at least one disk segment into a memory buffer;
   subtracting redundancy data corresponding to said first segment in said memory buffer from said redundancy-data cache segment;
   processing said first write request data in said memory buffer to store data contained therein in said main disk region; and
   freeing said one of said at least one disk segment for reuse.

3. The method of claim 2 wherein the step of processing includes the steps of:
   invalidating any write request data in said memory buffer which is overwritten by any write request data in any of said plurality of write cache segments;
   invalidating any write request data in said memory buffer which is overwritten by any write request data in any of said at least one disk segment; and
   posting, to said main disk region, any write request data remaining valid in said memory buffer.

4. The method of claim 3 wherein said main disk region is managed in accordance with RAID storage techniques and wherein the step of posting includes the steps of:
   performing write requests represented in said write request data remaining valid in said memory buffer in accordance with said RAID storage techniques.

5. The method of claim 3 wherein said cache memory includes at least one standard cache segment and wherein the step of processing further includes the steps of:
   invalidating any write request data in said at least one standard cache segment which is overwritten by any write request data in any of said plurality of write cache segments;
   invalidating any write request data in said at least one standard cache segment which is overwritten by any write request data in any of said at least one disk segment; and
   adding data associated with said write request data remaining valid in said memory buffer to said at least one standard cache segment.

6. The method of claim 5 further comprising the steps of:
   receiving a read request to read data from said subsystem;
   locating data requested by said read request in one of said plurality of write segments; and
   locating said data requested by said read request in one of said at least one disk segment in response to a failure to locate said data requested by said read request in said plurality of write segments.

7. The method of claim 6 further comprising the step of:
   locating said data requested by said read request in one of said at least one standard cache segment in response to a failure to locate said data requested by said read request in said one of said at least one disk segment.

8. The method of claim 1 wherein said at least one redundancy-data cache segments comprises a plurality of redundancy-data cache segments and wherein each of said plurality of redundancy-data cache segments is associated with a distinct subset of said plurality of write cache segments and wherein the step of accumulating comprises the step of:
   e.1) accumulating, in the redundancy-data cache segment associated with the distinct subset including said first segment, redundancy data corresponding to said first write request data.

9. The method of claim 8 further comprising the step of:
   e.2) switching to another distinct subset of said plurality of write cache segments and an associated one of said plurality of redundancy-data cache segments in response to filling of all write cache segments in a first distinct subset of said plurality of write cache segments.

10. The method of claim 1 wherein said at least one disk segment is distributed over a plurality of disk drives in a cache-extension disk region.

11. The method of claim 1 wherein said cache-extension disk region includes at least one redundancy-data disk segment and wherein the method further comprises the steps of:
    f.1) moving said redundancy-data cache segment to one of said at least one redundancy-data disk segment in response said first write request data from said first write cache segment to one of said at least one disk segment.

12. A method for logging write requests in a disk storage subsystem to improve write operation performance, said method comprising the steps of:
    partitioning a cache memory associated with said disk storage subsystem to logically define a plurality of log-structured write cache segments;
    partitioning disk space in said subsystem to logically define a log-structured cache region having at least one disk segment;
    logging first write request data corresponding to received write requests in a first segment of said plurality of write cache segments; and
    moving said write request data from said first write cache segment to one of said at least one disk segment in response to filling of said first segment.

13. The method of claim 12 further comprising the steps of:

logging further write request data corresponding to received write requests in a second segment of said plurality of write cache segments in response to filling of said first segment; and freeing said first segment for re-use in response to completion of said moving of write request data from said first segment to said one of said at least one disk segment.

14. The method of claim 13 further comprising the steps of:

further partitioning said cache memory to logically define at least one redundancy-data cache segment; and accumulating, in said at least one redundancy-data cache segment, redundancy data corresponding to said first write request data.

15. The method of claim 14 wherein said disk space includes a main disk region distinct from said log-structured cache region for persistent storage of data and wherein the method further comprises the steps of:

determining to flush said first write request data from said one of said at least one disk segment to said main disk region;

reading said first write request data from said one of said at least one disk segment into a memory buffer;

subtracting redundancy data corresponding to said first write request data in said memory buffer from said redundancy-data cache segment;

processing said first write request data in said memory buffer to store data contained therein in said main disk region; and freeing said one of said at least one disk segment for reuse.

16. The method of claim 15 wherein the step of processing includes the steps of:

invalidating any write request data in said memory buffer which is overwritten by any write request data in any of said plurality of write cache segments;

invalidating any write request data in said memory buffer which is overwritten by any write request data in any of said at least one disk segment; and posting, to said main disk region, any write request data remaining valid in said memory buffer.

17. The method of claim 16 wherein said main disk region is managed in accordance with RAID storage techniques and wherein the step of posting includes the steps of:

performing write requests represented in said write request data remaining valid in said memory buffer in accordance with said RAID storage techniques.

18. The method of claim 16 wherein said cache memory includes at least one standard cache segment and wherein the step of processing further includes the steps of:

invalidating any write request data in said at least one standard cache segment which is overwritten by any write request data in any of said plurality of write cache segments;

invalidating any write request data in said at least one standard cache segment which is overwritten by any write request data in any of said at least one disk segment; and adding data associated with said write request data remaining valid in said memory buffer to said at least one standard cache segment.

19. The method of claim 18 further comprising the steps of:

receiving a read request to read data from said subsystem;

locating data requested by said read request in one of said plurality of write segments; and locating said data requested by said read request in one of said at least one disk segment in response to a failure to locate said data requested by said read request in said plurality of write segments.

20. The method of claim 19 further comprising the step of:

locating said data requested by said read request in one of said at least one standard cache segment in response to a failure to locate said data requested by said read request in said one of said at least one disk segment.

21. The method of claim 14 wherein said at least one redundancy-data cache segments comprises a plurality of redundancy-data cache segments and wherein each of said plurality of redundancy-data cache segments is associated with a distinct subset of said plurality of write cache segments and wherein the step of accumulating comprises the step of:

accumulating, in the redundancy-data cache segment associated with the distinct subset including said first segment, redundancy data corresponding to said first write request data.

22. The method of claim 21 further comprising the step of:

switching to another distinct subset of said plurality of write cache segments and an associated one of said plurality of redundancy-data cache segments in response to filling of all write cache segments in a first distinct subset of said plurality of write cache segments.

23. The method of claim 12 wherein said at least one disk segment is distributed over a plurality of disk drives in a cache-extension disk region.

24. The method of claim 12 wherein said cache-extension disk region includes at least one redundancy-data disk segment and wherein the method further comprises the steps of:

moving said redundancy-data cache segment to one of said at least one redundancy-data disk segment in response said first write request data from said first write cache segment to one of said at least one disk segment.

25. A computer readable storage medium tangibly embodying programmed instructions for performing a method for utilizing cache memory in a disk storage subsystem to improve write operations, the method comprising the steps of:

a) partitioning said cache memory to logically define a plurality of log-structured write cache segments and at least one redundancy-data cache segment;

b) partitioning disk space in said subsystem to logically define a log-structured cache region having at least one disk segment;

c) logging first write request data corresponding to received write requests in a first segment of said plurality of write cache segments until said first segment is full;

d) logging further write request data corresponding to received write requests in a second segment of said plurality of write cache segments in response to said first segment being full;

e) accumulating, in said redundancy-data cache segment, redundancy data corresponding to said first write request data;

f) moving said first write request data from said first write cache segment to one of said at least one disk segment in response to accumulating said redundancy data; and g) repeating method steps c) through f) where said second segment is used as said first segment.

26. The storage medium of claim 25 wherein said disk space includes a main disk region distinct from said log-structured cache region for persistent storage of data and wherein the method further comprises the steps of:

determining to flush said first write request data from said one of said at least one disk segment to said main disk region;

reading said first write request data from said one of said at least one disk segment into a memory buffer;

subtracting redundancy data corresponding to said first segment in said memory buffer from said redundancy-data cache segment;

processing said first write request data in said memory buffer to store data contained therein in said main disk region; and freeing said one of said at least one disk segment for reuse.

27. The storage medium of claim 26 wherein the method step of processing includes the steps of:

invalidating any write request data in said memory buffer which is overwritten by any write request data in any of said plurality of write cache segments;

invalidating any write request data in said memory buffer which is overwritten by any write request data in any of said at least one disk segment; and posting, to said main disk region, any write request data remaining valid in said memory buffer.

28. The storage medium of claim 27 wherein said main disk region is managed in accordance with RAID storage techniques and wherein the method step of posting includes the steps of:

performing write requests represented in said write request data remaining valid in said memory buffer in accordance with said RAID storage techniques.

29. The storage medium of claim 27 wherein said cache memory includes at least one standard cache segment and wherein the method step of processing further includes the steps of:

invalidating any write request data in said at least one standard cache segment which is overwritten by any write request data in any of said plurality of write cache segments;

invalidating any write request data in said at least one standard cache segment which is overwritten by any write request data in any of said at least one disk segment; and adding data associated with said write request data remaining valid in said memory buffer to said at least one standard cache segment.

30. The storage medium of claim 29 further comprising the steps of:

receiving a read request to read data from said subsystem;

locating data requested by said read request in one of said plurality of write segments; and locating said data requested by said read request in one of said at least one disk segment in response to a failure to locate said data requested by said read request in said plurality of write segments.

31. The storage medium of claim 30 further comprising the step of:

locating said data requested by said read request in one of said at least one standard cache segment in response to a failure to locate said data requested by said read request in said one of said at least one disk segment.

32. The storage medium of claim 25 wherein said at least one redundancy-data cache segments comprises a plurality of redundancy-data cache segments and wherein each of said plurality of redundancy-data cache segments is associated with a distinct subset of said plurality of write cache segments and wherein the method step of accumulating comprises the step of:

e.1) accumulating, in the redundancy-data cache segment associated with the distinct subset including said first segment, redundancy data corresponding to said first write request data.

33. The storage medium of claim 32 wherein the method further comprises the step of:

e.2) switching to another distinct subset of said plurality of write cache segments and an associated one of said plurality of redundancy-data cache segments in response to filling of all write cache segments in a first distinct subset of said plurality of write cache segments.

34. The storage medium of claim 25 wherein said at least one disk segment is distributed over a plurality of disk drives in a cache-extension disk region.

35. The storage medium of claim 25 wherein said cache-extension disk region includes at least one redundancy-data disk segment and wherein the method further comprises the steps of:

f.1) moving said redundancy-data cache segment to one of said at least one redundancy-data disk segment in response said first write request data from said first write cache segment to one of said at least one disk segment.

36. A computer readable storage medium tangibly embodying programmed instructions for performing a method for logging write requests in a disk storage subsystem to improve write operation performance, said method comprising the steps of:

partitioning a cache memory associated with said disk storage subsystem to logically define a plurality of log-structured write cache segments;

partitioning disk space in said subsystem to logically define a log-structured cache region at least one disk segment;

logging first write request data corresponding to received write requests in a first segment of said plurality of write cache segments; and moving said write request data from said first write cache segment to one of said at least one disk segment in response to filling of said first segment.

37. The storage medium of claim 36 wherein the method further comprises the steps of:

logging further write request data corresponding to received write requests in a second segment of said plurality of write cache segments in response to filling of said first segment; and freeing said first segment for re-use in response to completion of said moving of write request data from said first segment to said one of said at least one disk segment.

38. The storage medium of claim 37 wherein the method further comprises the steps of:

further partitioning said cache memory to logically define at least one redundancy-data cache segment; and accumulating, in said at least one redundancy-data cache segment, redundancy data corresponding to said first write request data.

39. The storage medium of claim 38 wherein said disk space includes a main disk region distinct from said log-structured cache region for persistent storage of data and wherein the method further comprises the steps of:

determining to flush said first write request data from said one of said at least one disk segment to said main disk region;

reading said first write request data from said one of said at least one disk segment into a memory buffer;

subtracting redundancy data corresponding to said first write request data in said memory buffer from said redundancy-data cache segment;

processing said first write request data in said memory buffer to store data contained therein in said main disk region; and freeing said one of said at least one disk segment for reuse.

40. The storage medium of claim 39 wherein the method step of processing includes the steps of:

invalidating any write request data in said memory buffer which is overwritten by any write request data in any of said plurality of write cache segments;

invalidating any write request data in said memory buffer which is overwritten by any write request data in any of said at least one disk segment; and posting, to said main disk region, any write request data remaining valid in said memory buffer.

41. The storage medium of claim 40 wherein said main disk region is managed in accordance with RAID storage techniques and wherein the method step of posting includes the steps of:

performing write requests represented in said write request data remaining valid in said memory buffer in accordance with said RAID storage techniques.

42. The storage medium of claim 40 wherein said cache memory includes at least one standard cache segment and wherein the method step of processing further includes the steps of:

invalidating any write request data in said at least one standard cache segment which is overwritten by any write request data in any of said plurality of write cache segments;

invalidating any write request data in said at least one standard cache segment which is overwritten by any write request data in any of said at least one disk segment; and adding data associated with said write request data remaining valid in said memory buffer to said at least one standard cache segment.

43. The storage medium of claim 42 wherein the method further comprises the steps of:

receiving a read request to read data from said subsystem;

locating data requested by said read request in one of said plurality of write segments; and locating said data requested by said read request in one of said at least one disk segment in response to a failure to locate said data requested by said read request in said plurality of write segments.

44. The storage medium of claim 43 wherein the method further comprises the step of:

locating said data requested by said read request in one of said at least one standard cache segment in response to a failure to locate said data requested by said read request in said one of said at least one disk segment.

45. The storage medium of claim 38 wherein said at least one redundancy-data cache segments comprises a plurality of redundancy-data cache segments and wherein each of said plurality of redundancy-data cache segments is associated with a distinct subset of said plurality of write cache segments and wherein the method step of accumulating comprises the step of:

accumulating, in the redundancy-data cache segment associated with the distinct subset including said first segment, redundancy data corresponding to said first write request data.

46. The storage medium of claim 45 wherein the method further comprises the step of:

switching to another distinct subset of said plurality of write cache segments and an associated one of said plurality of redundancy-data cache segments in response to filling of all write cache segments in a first distinct subset of said plurality of write cache segments.

47. The storage medium of claim 36 wherein said at least one disk segment is distributed over a plurality of disk drives in a cache-extension disk region.

48. The storage medium of claim 36 wherein said cache-extension disk region includes at least one redundancy-data disk segment and wherein the method further comprises the steps of:

moving said redundancy-data cache segment to one of said at least one redundancy-data disk segment in response said first write request data from said first write cache segment to one of said at least one disk segment.

* * * * *